(12) United States Patent
Sasaki

(10) Patent No.: US 8,395,639 B2
(45) Date of Patent: Mar. 12, 2013

(54) COLOR PROCESSOR, COLOR PROCESSING METHOD AND COMPUTER READABLE MEDIUM

(75) Inventor: Makoto Sasaki, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1004 days.

(21) Appl. No.: 12/335,158

(22) Filed: Dec. 15, 2008

(65) Prior Publication Data

US 2009/0237416 A1 Sep. 24, 2009

(30) Foreign Application Priority Data

Mar. 19, 2008 (JP) ................................ 2008-072534

(51) Int. Cl.
*G09G 5/02* (2006.01)
(52) U.S. Cl. ........ 345/604; 345/418; 345/589; 345/590; 345/591; 382/162; 358/518; 358/519; 358/520
(58) Field of Classification Search .................. 345/418, 345/589–591, 604; 382/162; 358/518–520
See application file for complete search history.

(56) References Cited

U.S. PATENT DOCUMENTS

| 5,087,126 | A | | 2/1992 | Pochieh | |
|---|---|---|---|---|---|
| 6,100,999 | A | * | 8/2000 | Ikegami | ........................ 358/1.9 |
| 6,952,494 | B2 | * | 10/2005 | Odagiri et al. | ................ 382/162 |
| 2004/0086193 | A1 | * | 5/2004 | Kameyama et al. | .......... 382/254 |
| 2004/0131251 | A1 | | 7/2004 | Sasaki | |
| 2005/0128498 | A1 | * | 6/2005 | Matsuzaki | ...................... 358/1.9 |
| 2005/0237553 | A1 | * | 10/2005 | Takahashi et al. | .............. 358/1.9 |
| 2007/0159645 | A1 | * | 7/2007 | Nishikawa | ...................... 358/1.9 |
| 2007/0291312 | A1 | * | 12/2007 | Kaneko et al. | .................. 358/2.1 |

FOREIGN PATENT DOCUMENTS

| JP | A-2-226870 | 9/1990 |
|---|---|---|
| JP | A-2004-178050 | 6/2004 |
| JP | A-2006-74482 | 3/2006 |

* cited by examiner

*Primary Examiner* — Xiao M. Wu
*Assistant Examiner* — Todd Buttram
(74) *Attorney, Agent, or Firm* — Oliff & Berridge, PLC

(57) ABSTRACT

The color processor includes: a conversion source color data acquiring part acquiring a conversion source color dataset in a first color space; a color data pair acquiring part acquiring color data pairs each composed of color datasets in the first and second color spaces, the color datasets being used to calculate a color conversion characteristic model; a color conversion characteristic model calculator assigning weight to the color dataset in the first color space, according to a color difference distance from the conversion source color dataset, and calculates the model by use of color data pairs each including a weighted color dataset in the first color space; and an evaluation value calculator calculating an evaluation value indicating an evaluation on influence of the color data pairs on color conversion accuracy of the model. The color conversion characteristic model calculator adjusts the weight according to the evaluation value, when calculating the model.

12 Claims, 25 Drawing Sheets

COLOR PROCESSOR, COLOR PROCESSING METHOD AND COMPUTER READABLE MEDIUM

CROSS REFERENCE TO RELATED APPLICATIONS

This application is based on and claims priority under 35 USC §119 from Japanese Patent Application No. 2008-072534 filed Mar. 19, 2008.

BACKGROUND

1. Technical Field

The present invention relates to a color processor, a color processing method and a computer readable medium.

2. Related Art

Apparatuses for inputting and outputting color images each perform a processing of outputting a color image by converting an input color signal, for example, in the RGB color space, into a color signal, for example, in a device-independent L*a*b* color space, and by further converting the resultant color signal into a color signal, for example, in the CMYK color space which is an output color space in the apparatus. As such apparatuses, there are, for example, an image forming apparatus such as a printer, a display such as a liquid crystal display and an image reading apparatus such as a scanner. When performing the output processing, each of the apparatuses estimates a color conversion characteristic model specifying a correspondence between the CMYK color space and the L*a*b* color space, for example, on the basis of pairs (actual data pairs) each including actual color data pieces actually measured in the CMYK color space, and actual data pieces actually measured in the L*a*b* color space. Thus, the apparatus generates colors that are not included in the actual data pairs.

SUMMARY

According to an aspect of the invention, there is provided a color processor including: a conversion source color data acquiring part that acquires a conversion source color dataset in a first color space; a color data pair acquiring part that acquires color data pairs each composed of a color dataset in the first color space and a color dataset in a second color space that is a conversion destination color space, the color dataset in the first color space and the color dataset in the second color space being both used to calculate a color conversion characteristic model specifying a correspondence between a color in the first color space and a color in the second color space; a color conversion characteristic model calculator that assigns weight to the color dataset in the first color space included in corresponding one of the color data pairs acquired by the color data pair acquiring part, according to a color difference distance between the color dataset in the first color space and the conversion source color dataset acquired by the conversion source color data acquiring part, and calculates the color conversion characteristic model by use of color data pairs each including a weighted color dataset in the first color space; and an evaluation value calculator that calculates an evaluation value indicating an evaluation on influence of the color data pairs on color conversion accuracy of the color conversion characteristic model. The color conversion characteristic model calculator adjusts the weight to be assigned to the color dataset in the first color space according to the evaluation value calculated by the evaluation value calculator, when calculating the color conversion characteristic model.

BRIEF DESCRIPTION OF THE DRAWINGS

Exemplary embodiment(s) of the present invention will be described in detail based on the following figures, wherein.

DETAILED DESCRIPTION

Hereinafter, an exemplary embodiment of the present invention will be described in detail with reference to the accompanying drawings.

Figure 1:
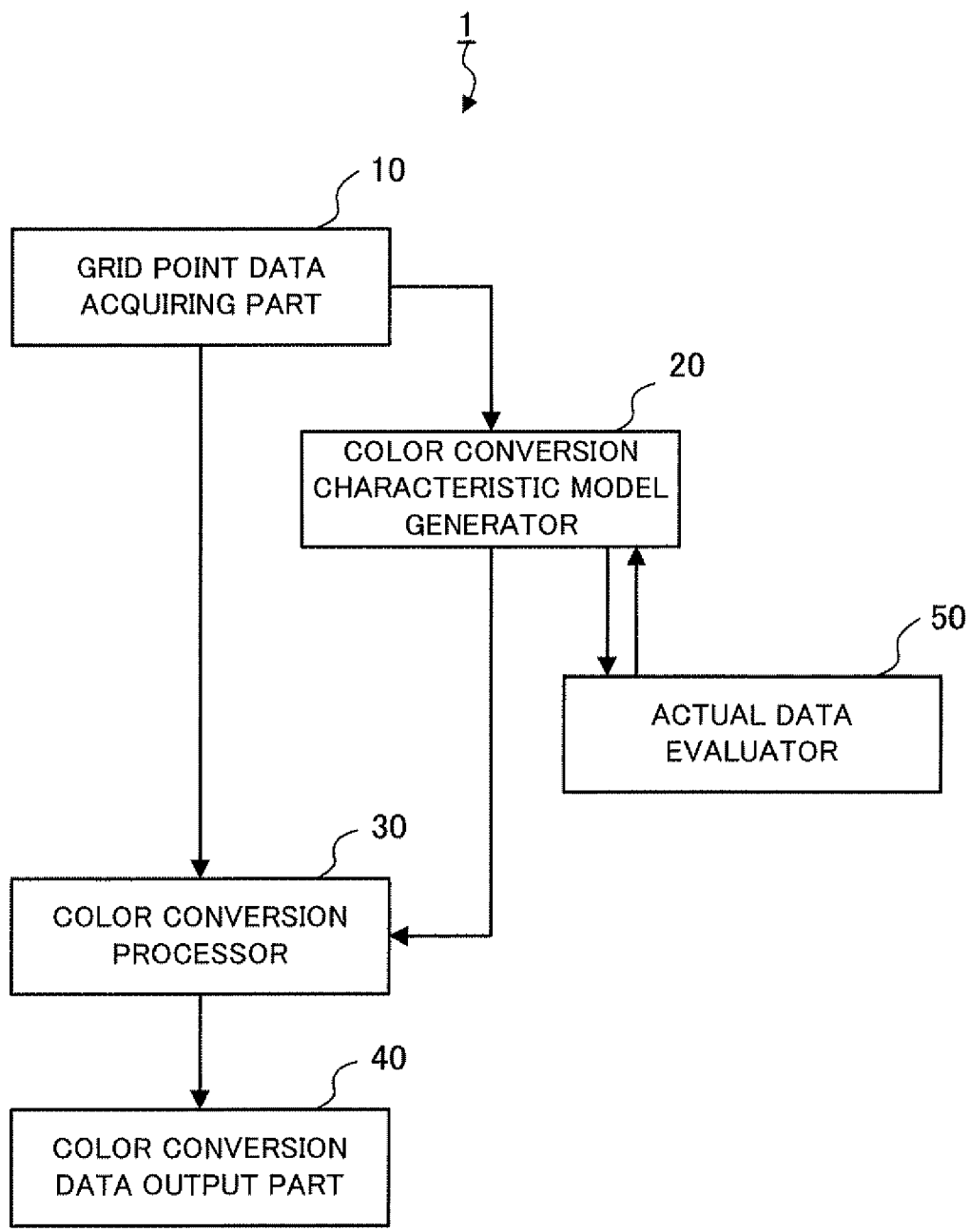
FIG. 1 is a block diagram showing an entire configuration of a color processor to which the present exemplary embodiment is applied.

FIG. 1 is a block diagram showing an entire configuration of a color processor 1 to which the present exemplary embodiment is applied. The color processor 1 shown in FIG. 1 includes: a grid point data acquiring part 10 that receives an input of grid point datasets; a color conversion characteristic model generator 20 that generates a color conversion characteristic model to be used for color conversion processing on the grid point datasets; a color conversion processor 30 that performs the color conversion processing on the grid point datasets according to the color conversion characteristic model generated by the color conversion characteristic model generator 20; a color conversion data output part 40 that outputs the grid point datasets received by the grid point data acquiring part 10, and the color datasets color-converted by the color conversion processor 30, in association with each other; and an actual data evaluator 50 that is one example of an evaluation value calculator calculating an evaluation value for evaluating actual datasets to be used by the color conversion characteristic model generator 20 to generate the color conversion characteristic model.

The grid point data acquiring part 10 is one example of a conversion source color data acquiring part for acquiring conversion source color datasets to be color-converted, and obtains color datasets (conversion source color datasets) regularly aligned in a color space (for example, in the CMYK color space or the L*a*b* color space) processed by, for example, a color image forming apparatus or the like such as a color printer. The color datasets regularly aligned are generally referred to as "grid points." In this specification, the color coordinates of each of these grid points are referred to as a "grid point dataset."

For example, in the four-dimensional CMYK color space, the coordinate values of C, M, Y and K are each set to be within a range of 0 to 100, in general. Color coordinate values on each of the color coordinate axes are divided by any certain number of steps (for example, 10 steps), and all combinations of the divided color coordinate values are prepared as grid point datasets in the CMYK color space. For example, grid point data datasets of (0, 0, 0, 0), (0, 10, 0, 0), (0, 0, 10, 0), (0, 0, 0, 10) . . . and the like are acquired in case of dividing the color coordinate values by 10 steps.

Meanwhile, for example, in the three-dimensional L*a*b* color space, the coordinate value of the lightness L* is set to be within a range of 0 to 100, and the coordinate values of chromaticity a* and b* are set to be within a range of −300 to 300, in general. Similarly to the above, color coordinate values on each of the coordinate axes are divided by any certain number of steps, and all combinations of color coordinate values are prepared as grid point datasets.

In the grid point data acquiring part 10, color coordinates on the grid points in, for example, the CMYK color space or the L*a*b* color space described above are inputted as grid point datasets. Then, the acquired grid point datasets are outputted to the color conversion characteristic model generator 20 and the color conversion processor 30.

By use of actual data pairs (color data pairs), the color conversion characteristic model generator 20 generates a color conversion characteristic model to be used by the color conversion processor 30 to execute the color conversion processing. More specifically, each of the actual data pairs includes: a color dataset of a color sample (color patch) generated by one of various combinations of color coordinate values within a color space (for example, the CMYK color space) of grid point datasets inputted from the grid point data acquiring part 10; and its corresponding color dataset obtained by actually measuring the color of the generated color patch in a conversion destination color space (for example, the L*a*b* color space).

Here, the "color conversion characteristic model" is used, for example, to convert a color signal (first color signal) in the first color space into a color signal (second color signal) in a second color space. More specifically, the "color conversion characteristic model" is used to formulate and specify a correspondence between the first color signal and the second color signal for the color conversion. Based on the estimation result on the actual data pairs by the actual data evaluator 50, the color conversion characteristic model generator 20 in the present exemplary embodiment adjusts parameters assigned to the actual datasets when generating the color conversion characteristic model. This adjustment will be described later in more detail.

The color conversion processor 30 performs the color conversion processing on the grid point datasets acquired from the grid point data acquiring part 10, according to the color conversion characteristic model generated by the color conversion characteristic model generator 20. More specifically, according to a color conversion characteristic model (normal conversion) generated by the color conversion characteristic model generator 20, grid point datasets in, for example, the CMYK color space, for example, acquired from the grid point data acquiring part 10 are converted into color datasets in the L*a*b* color space, for example, which is a color space independent of devices (a device-independent color space). In addition, according to another color conversion characteristic model (inverse conversion) generated by the color conversion characteristic model generator 20, grid point datasets in the L*a*b* color space, for example, acquired from the grid point data acquiring part 10 are converted into color datasets in the CMYK color space, for example, which is a color space dependent on devices (device-dependent color space). Then, the color conversion processor 30 outputs the color datasets obtained by the color conversion processing, to the color conversion data output part 40.

The color conversion data output part 40 associates the grid point datasets (a first color signal) that are received by the grid point data acquiring part 10, with the color datasets (a second color signal) that are color-converted by the color conversion processor 30 from the respective grid point datasets received by the grid point data acquiring part 10. Then, the color conversion data output part 40 outputs a data group including, as a pair, each grid point dataset and its corresponding color-converted color dataset associated with each other. This data group is used to generate a color conversion table called a direct look-up table (DLUT) used when a color image forming apparatus such as a color printer, for example, or another similar apparatus performs the color conversion processing on image data inputted from an external device such as a personal computer (PC).

Next, the actual data evaluator 50 in the present exemplary embodiment will be described.

As described above, the color conversion characteristic model generator 20 generates the color conversion characteristic model by using the actual data pairs each composed of the color dataset of a color patch generated in the CMYK color space, and the color dataset obtained by measuring the color of the color patch in the L*a*b* color space. The color conversion characteristic model has a feature that its color conversion accuracy is determined depending on actual data pairs used to generate the color conversion characteristic model, more specifically, depending on a dispersion state of the actual datasets of the actual data pairs in the CMYK color space and a dispersion state of the actual datasets thereof in the L*a*b* color space. For this reason, the actual data evaluator 50 figures out statistical variances (simply called "variances" below) in the CMYK color space and the L*a*b* color space of the actual data pairs to be used. Then, based on the figured-out variances of the actual data pairs, the actual data evaluator 50 calculates an evaluation value for evaluating the color conversion accuracy of the color conversion characteristic model generated from the actual data pairs.

The evaluation value calculated by the actual data evaluator 50 is transmitted to the color conversion characteristic model generator 20. Then, based on the evaluation value, the color conversion characteristic model generator 20 adjusts the setting values of parameters (for example, weight) to be assigned to actual data pairs when generating the color conversion characteristic model.

Figure 2:
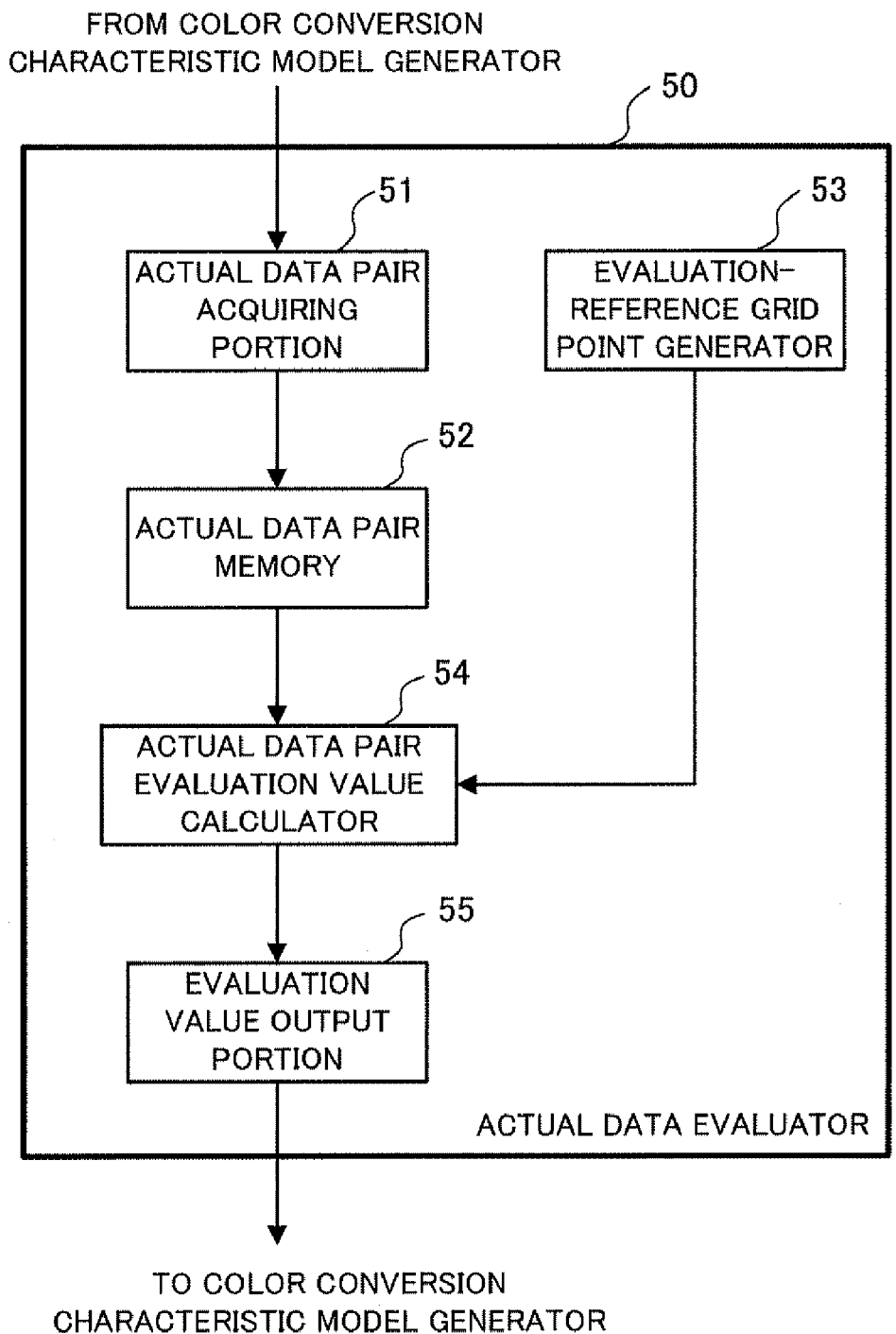
FIG. 2 is a block diagram showing a functional configuration of the actual data evaluator.

FIG. 2 is a block diagram showing a functional configuration of the actual data evaluator 50. As shown in FIG. 2, the actual data evaluator 50 includes an actual data pair acquiring portion 51, an actual data pair memory 52, an evaluation-reference grid point generator 53, an actual data pair evaluation value calculator 54, and an evaluation value output portion 55.

The actual data pair acquiring portion 51 acquires actual data pairs (color data pairs) used by the color conversion characteristic model generator 20 to generate the color conversion characteristic model.

The actual data pair memory 52 stores the actual data pairs acquired by the actual data pair acquiring portion 51. More specifically, the actual data pair memory 52 stores n sets of actual data pairs where each actual data pair is composed of an actual dataset $(x_{1i}, x_{2i}, x_{3i}, x_{4i})$ representing a color sample (color patch) in the CMYK color space (first color space), and the corresponding actual dataset $(y_{1i}, y_{2i}, y_{3i})$ obtained by measuring the color of the color sample in the L*a*b* color space (second color space). Here, n and i are integers where i=1 to n.

The evaluation-reference grid point generator 53 generates reference color coordinate points that are used as evaluation reference positions in the color space when the actual data pairs are each evaluated in terms of the influence on the color conversion accuracy of the color conversion characteristic model. To be more precise, the evaluation-reference grid point generator 53 generates evaluation-reference grid point datasets $(C_L, M_L, Y_L, K_L)$ in the CMYK color space (first color space) for an evaluation of the actual data pairs that is used when the color conversion characteristic model is generated Since the evaluation-reference grid point datasets generated by the evaluation-reference grid point generator 53 are used to evaluate the actual data pairs, it is generally unnecessary to prepare the same number of datasets as that of the grid point datasets inputted from the grid point data acquiring part 10. Thus, the evaluation-reference grid point generator 53 divides the color coordinate values by a larger number of steps (20 steps, for example) than that of the grid point datasets inputted from the grid point data acquiring part 10, for example, and then generates the evaluation-reference grid point datasets. Instead, when actual data pairs in a particular area inside the color space are evaluated in more detail, for example, the evaluation-reference grid point generator 53 may divide the color coordinate values in the particular area by a smaller number of steps (5 steps, for example) than that of the grid point datasets inputted from the grid point data acquiring part 10, and then generate the evaluation-reference grid point datasets. Otherwise, the evaluation-reference grid point generator 53 may divide the color coordinate values by the same number of steps (10 steps, for example) as that of the grid point datasets inputted from the grid point data acquiring part 10, and then generate the evaluation-reference grid point datasets.

In essence, the evaluation-reference grid point dataset $(C_L, M_L, Y_L, K_L)$ generated by the evaluation-reference grid point generator 53 serves as an evaluation-reference position in the color space for calculating an estimation (an evaluation value) representing what kind of error occurs on the color conversion characteristic model due to the actual data pairs used to generate the color conversion characteristic model.

The actual data pair evaluation value calculator 54 acquires the evaluation-reference grid point dataset $(C_L, M_L, Y_L, K_L)$ in the CMYK color space (first color space) from the evaluation-reference grid point generator 53. Moreover, from the actual data pair memory 52, the actual data pair evaluation value calculator 54 reads out the actual data pairs each composed of the actual dataset $(x_{1i}, x_{2i}, x_{3i}, x_{4i})$ in the CMYK color space, positioned around each evaluation-reference grid point, in the CMYK color space, generated by the evaluation-reference grid point generator 53, and the corresponding actual dataset $(y_{1i}, y_{2i}, y_{3i})$ in the L*a*b* color space (second color space). Then, the actual data pair evaluation value calculator 54 calculates, on the basis of the read actual data pairs, the dispersion of the actual datasets $(x_{1i}, x_{2i}, x_{3i}, x_{4i})$ in the CMYK color space, and the dispersion of the actual datasets $(y_{1i}, y_{2i}, y_{3i})$ in the L*a*b* color space.

Here, a description is given for a relationship between the dispersion of the actual datasets in each of the color spaces, and the color conversion accuracy of the color conversion characteristic model generated by using the actual data pairs.

Figure 3:
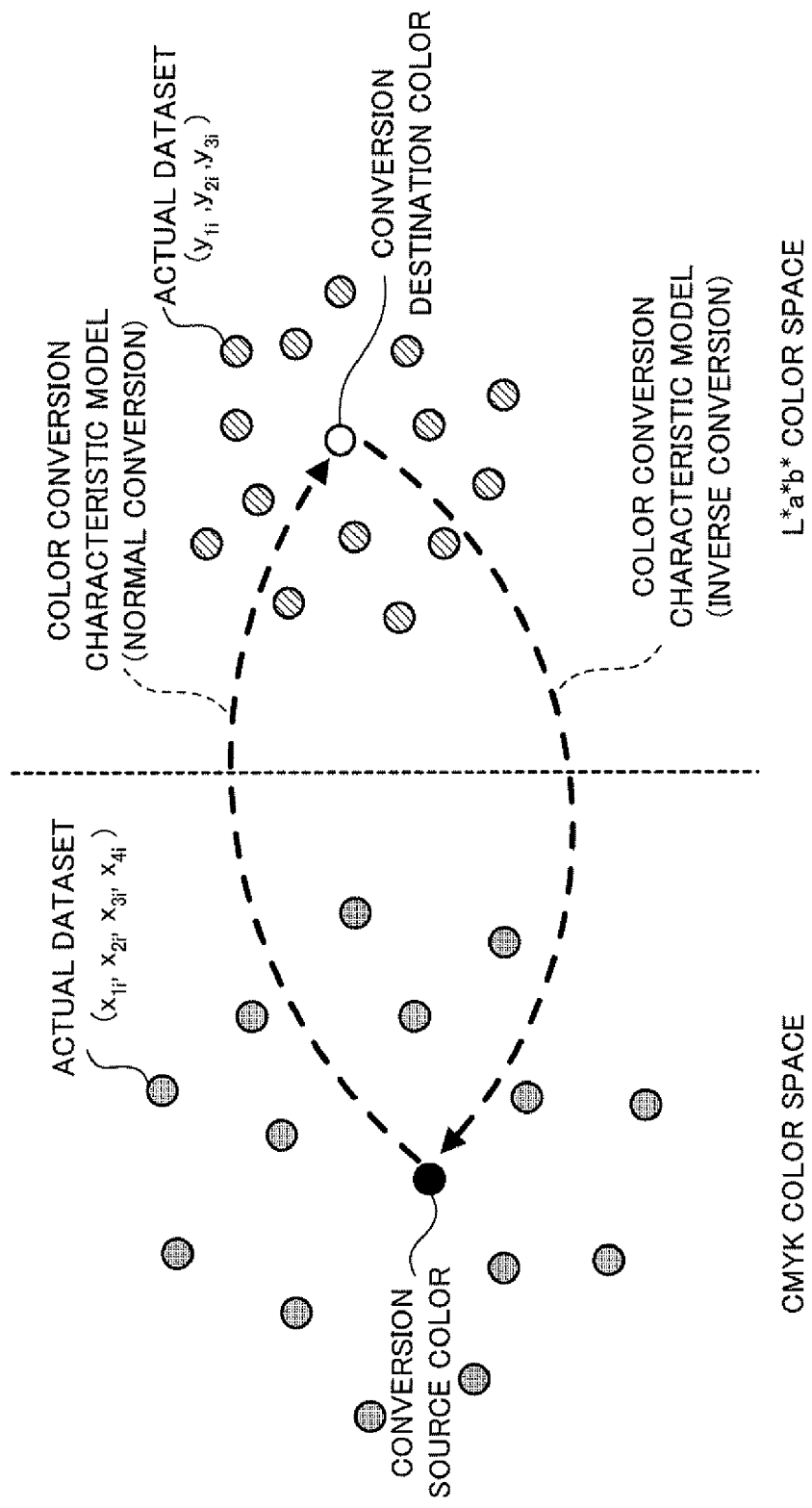
FIG. 3 is a diagram for explaining a function of the color conversion characteristic model.

To begin with, FIG. 3 is a diagram for explaining a function of the color conversion characteristic model. As shown in FIG. 3, the color conversion characteristic model is a function that specifies mapping between the CMYK color space (first color space) and the L*a*b* color space (second color space). According to the color conversion characteristic model, a color dataset (conversion source color) in the CMYK color space is converted into a color dataset (conversion destination color) in the L*a*b* color space. Here, the color conversion from the CMYK color space that is the first color space, to the L*a*b* color space that is the second color space, is termed as a normal conversion, and the color conversion characteristic model for this normal conversion is termed as "the normal color conversion characteristic model." On the other hand, a color dataset (conversion destination color) in the L*a*b* color space is converted into a color dataset (conversion source color) in the CMYK color space according to "the inverse color conversion characteristic model" that is for a color conversion from the second color space to the first color space.

In this case, the normal color conversion characteristic model is generated by mainly using actual datasets ($x_{1i}$, $x_{2i}$, $x_{3i}$, $x_{4i}$) in the CMYK color space around the conversion source color, and their corresponding actual datasets ($y_{1i}$, $y_{2i}$, $y_{3i}$) in the L*a*b* color space. On the other hand, the inverse color conversion characteristic model is generated by mainly using actual datasets ($y_{1i}$, $y_{2i}$, $y_{3i}$) in the L*a*b* color space around the conversion destination color, and their corresponding actual datasets ($x_{1i}$, $x_{2i}$, $x_{3i}$, $x_{4i}$) in the CMYK color space.

Figure 4:
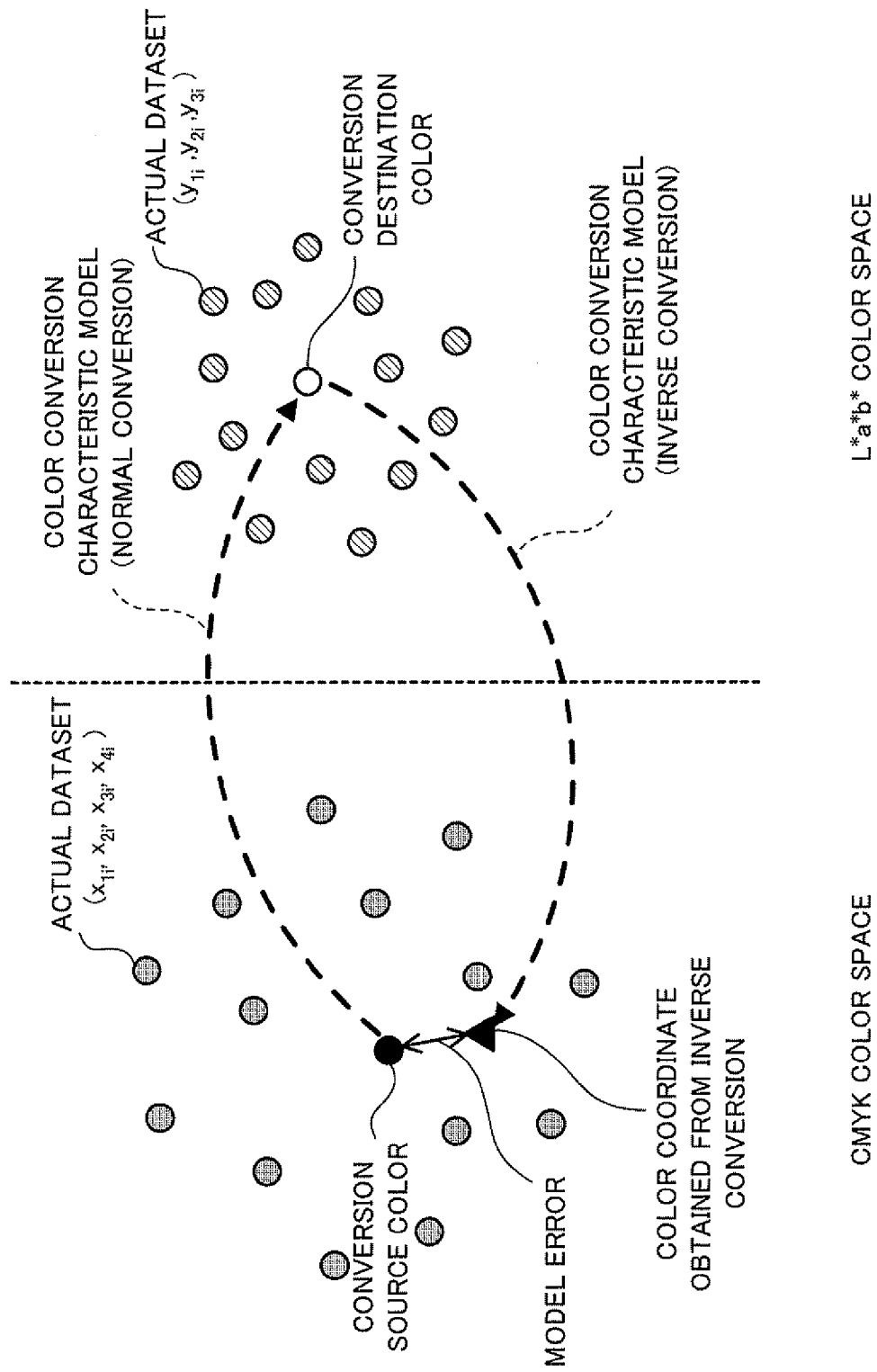
FIG. 4 is a diagram for explaining an error caused when a conversion destination color obtained from the normal conversion is inversely converted into color coordinates in the originally-expressed CMYK color space.

Next, FIG. 4 is a diagram for explaining an error caused when a conversion destination color obtained from the normal conversion is inversely converted into color coordinates in the originally-expressed CMYK color space. Here, consider a case where a conversion source color in the CMYK color space is converted into a conversion destination color in the L*a*b* color space according to the normal color conversion characteristic model and then the conversion destination color in the L*a*b* color space is inversely converted into color coordinates in the originally-expressed CMYK color space according to the inverse color conversion characteristic model. In this case, as shown in FIG. 4, the color coordinates obtained from the inverse conversion do not always completely coincide with the coordinates of the original conversion source color, and thus sometimes have an error from the original conversion source color.

This error is attributed to the fact that the actual datasets used to generate the normal color conversion characteristic model are different from the actual datasets used to generate the inverse color conversion characteristic model. This error is what is termed as "a model error" caused by a difference between the two models. More specifically, the actual datasets ($x_{1i}$, $x_{2i}$, $x_{3i}$, $x_{4i}$) in the CMYK color space around the conversion source color, and their corresponding actual datasets ($y_{1i}$, $y_{2i}$, $y_{3i}$) in the L*a*b* color space are mainly used to generate the normal color conversion characteristic model, as described above. On the other hand, the actual datasets ($y_{1i}$, $y_{2i}$, $y_{3i}$) in the L*a*b* color space around the conversion destination color, and their corresponding actual datasets ($x_{1i}$, $x_{2i}$, $x_{3i}$, $x_{4i}$) in the CMYK color space are mainly used to generate the inverse color conversion characteristic model. When the actual datasets ($y_{1i}$, $y_{2i}$, $y_{3i}$) in the L*a*b* color space corresponding to the actual datasets ($x_{1i}$, $x_{2i}$, $x_{3i}$, $x_{4i}$) in the CMYK color space are unevenly present in the L*a*b* color space, the color conversion accuracy of the inverse color conversion characteristic model is lowered. Hence, a large model error occurs.

Figure 5:
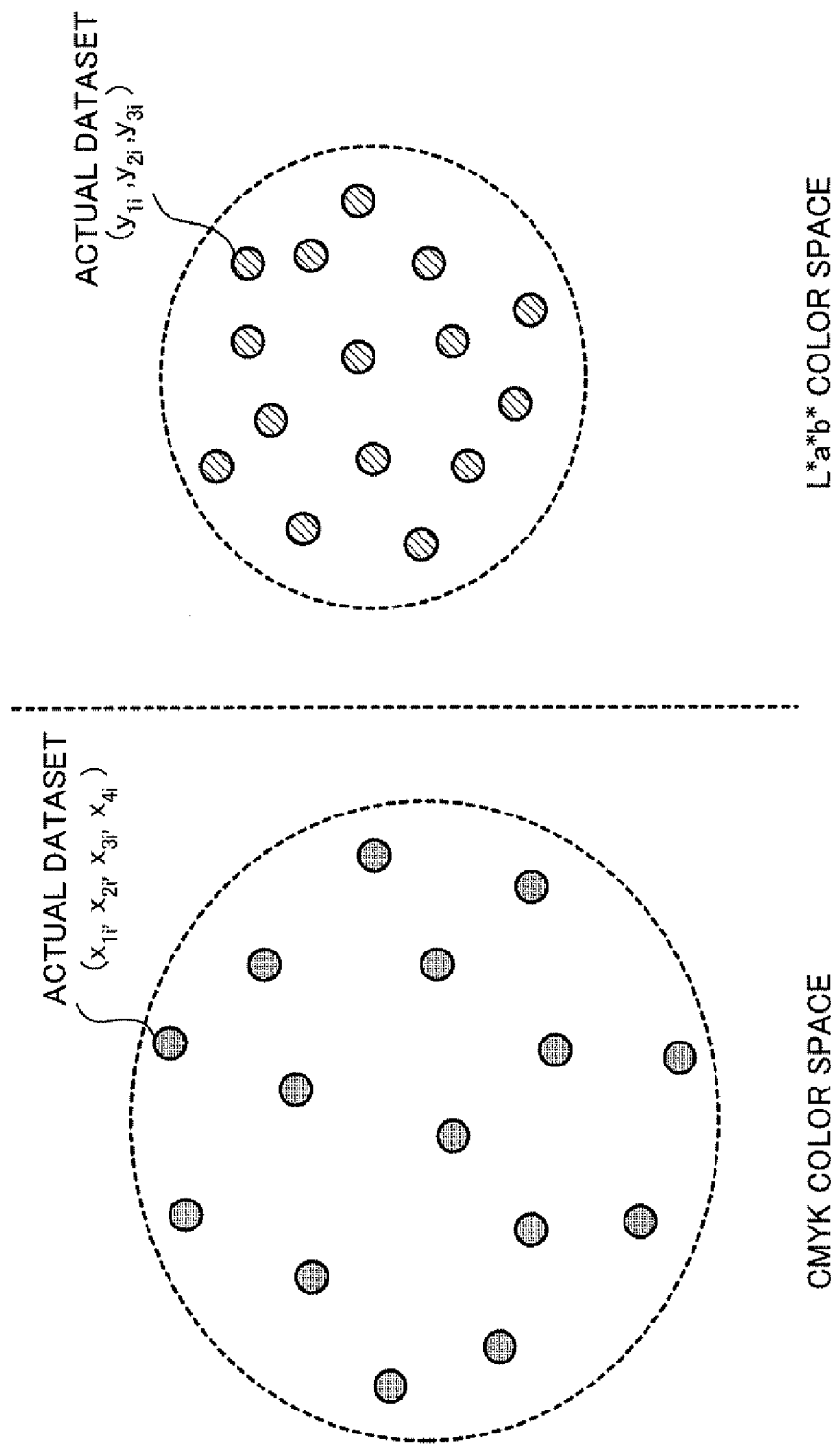
FIGS. 5, 6A and 6B are diagrams each showing the dispersion state of actual datasets in the CMYK color space and the dispersion state of the actual datasets in the L*a*b* color space corresponding to the actual datasets in the CMYK color space.
Figure 6A:
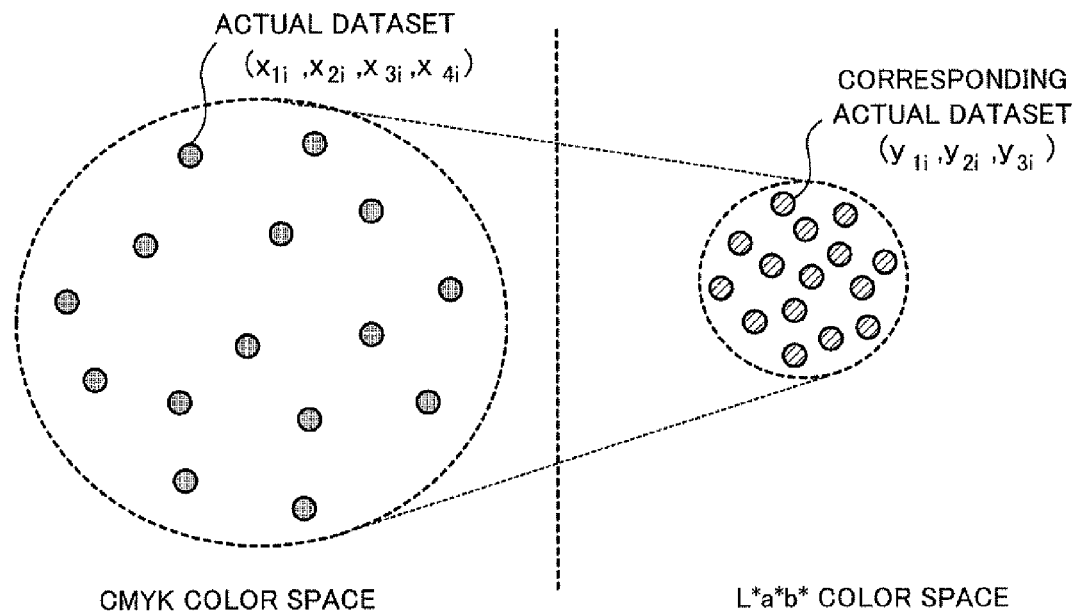
Figure 6B:
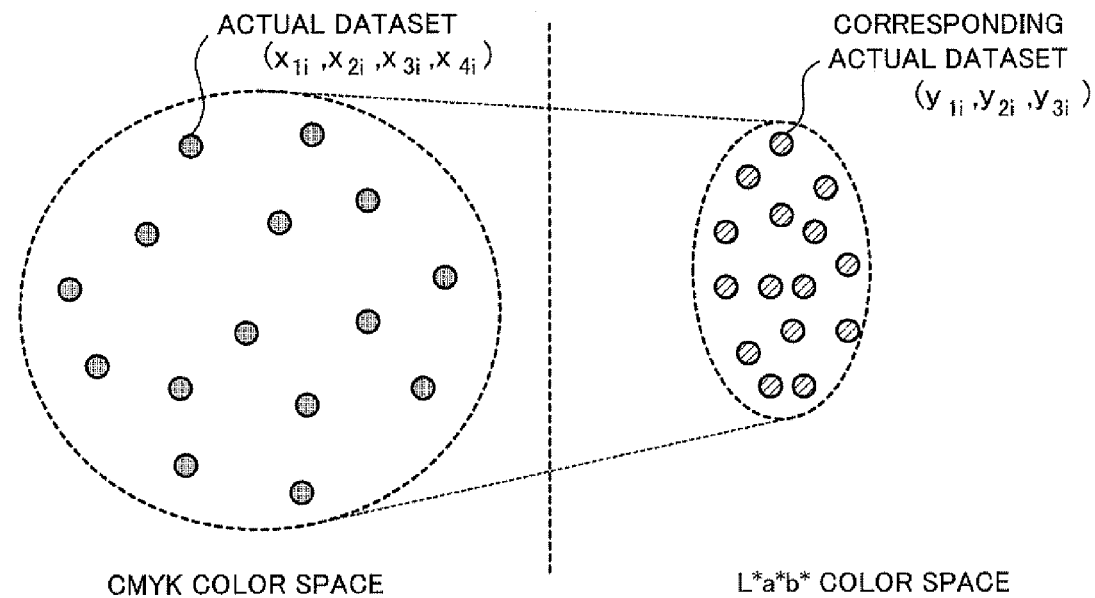

FIGS. 5, 6A and 6B are diagrams each showing the dispersion state of actual datasets in the CMYK color space and the dispersion state of the actual datasets in the L*a*b* color space corresponding to the actual datasets in the CMYK color space. The color patches generated with various combinations of color coordinate values in the CMYK color space are set so that the color coordinates ($x_{1i}$, $x_{2i}$, $x_{3i}$, $x_{4i}$) of these color patches are appropriately dispersed in the CMYK color space. As shown in FIG. 5, if the color coordinates ($y_{1i}$, $y_{2i}$, $y_{3i}$) obtained by measuring the colors of the color patches in the L*a*b* color space are appropriately dispersed in the L*a*b* color space according to the setting of the color coordinates ($x_{1i}$, $x_{2i}$, $x_{3i}$, $x_{4i}$), the color coordinate points ($y_{1i}$, $y_{2i}$, $y_{3i}$) exist at intervals of appropriate color difference distance in the L*a*b* color space.

However, there are cases where the color coordinate points ($y_{1i}$, $y_{2i}$, $y_{3i}$) representing the colorimetry values of the color patches in the L*a*b* color space are distributed in a concentrated manner in a small region as shown in FIG. 6A, and are unevenly distributed in a particular region as shown in FIG. 6B, and other similar cases. Under these dispersion states, the color coordinate points ($y_{1i}$, $y_{2i}$, $y_{3i}$) exist in proximity to each other with small color difference distance in the L*a*b* color space. Such a situation is highly likely to occur in a case of using color patches each having a large K value.

Figure 7:
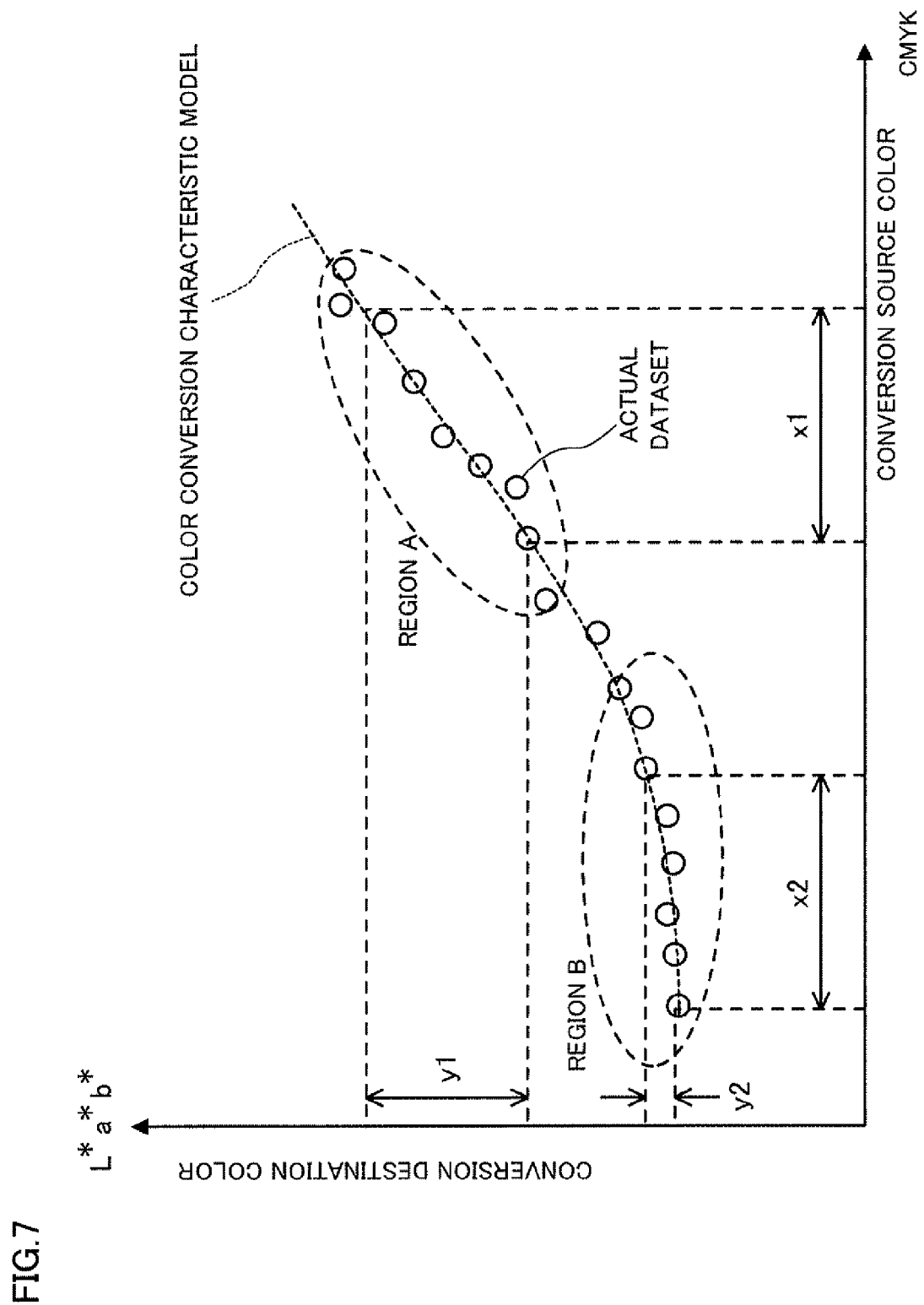
FIG. 7 is a graph for explaining the relationship between the dispersion state of the actual datasets in the L*a*b* color space, and the color conversion accuracy of the color conversion characteristic model generated by using the actual data pairs.

Here, FIG. 7 is a graph for explaining the relationship between the dispersion state of the actual datasets in the L*a*b* color space, and the color conversion accuracy of the color conversion characteristic model generated by using the actual data pairs. A region A shown in FIG. 7 is a region corresponding to FIG. 5, and has a relatively large dispersion y1 of the actual datasets in the L*a*b* color space corresponding to a dispersion x1 of actual datasets in the CMYK color space. For this reason, the color conversion characteristic model generated in this region A has such an appropriate gradient (rate of change), and thus only a small conversion error occurs in a conversion from the color signals in the CMYK color space into the color signals in the L*a*b* color space.

On the other hand, a region B in FIG. 7 is a region corresponding to FIG. 6A or 6B, and has a relatively small dispersion y2 of the actual datasets in the L*a*b* color space corresponding to a dispersion x2 of the actual datasets in the CMYK color space. Accordingly, the color conversion characteristic model generated in this region B has such a low gradient (rate of change), and thus a large conversion error occurs in a conversion from the color signals in the CMYK color space into the color signals in the L*a*b* color space. Moreover, errors in the measuring of the colors of the color datasets in the L*a*b* color space largely influence the color conversion accuracy of the color conversion characteristic model.

As a result, it is expected that the color conversion accuracy of the color conversion characteristic model in the region B will be low if the color conversion characteristic model for the region B in FIG. 7, for example, is generated in the same manner as that for the region A (for instance, by using the same parameter values as those for the region A).

To avoid this, the actual data pair evaluation value calculator 54 figures out the dispersion of the actual datasets ($x_{1i}$, $x_{2i}$, $x_{3i}$, $x_{4i}$) in the CMYK color space (first color space) and the dispersion of the actual datasets ($y_{1i}$, $y_{2i}$, $y_{3i}$) in the L*a*b* color space (second color space). In addition, the actual data pair evaluation value calculator 54 calculates a relative ratio (relative dispersion value) of the dispersion of the actual datasets in the CMYK color space with respect to the dispersion of the actual datasets in L*a*b* color space. Then, the calculated relative dispersion value is determined as an evaluation value for the actual datasets. Consequently, the color conversion accuracy of the color conversion characteristic model generated from the actual data pairs is estimated in reference to the calculated relative dispersion value (evaluation value).

As shown in FIG. 7, in a region having a high relative dispersion value (y1/x1 such as the region A, for example, the generated color conversion characteristic model has an appropriate gradient (rate of change). In other words, the correspondence between the color datasets in the CMYK color space and the color datasets in the L*a*b* color space is high. Thus, the color conversion characteristic model for the region A causes only a small error in the conversions between the color datasets in the CMYK color space and the color datasets in the L*a*b* color space, and this enhances the color conversion accuracy of the color conversion characteristic model for the region A. On the other hand, in a region having a small relative dispersion value (y2/x2) such as the region B, for example, the generated color conversion characteristic model has a low gradient (rate of change). In other words, the correspondence between the color datasets in the CMYK color space and the color datasets in the L*a*b* color space is low. Thus, the color conversion characteristic model for the region B is more likely to cause an error in the conversions between the color datasets in the CMYK color space and the color datasets in the L*a*b* color space, and this lowers the color conversion accuracy of the color conversion characteristic model for this region B.

In this way, for every region in the color space, the color conversion accuracy of the generated color conversion characteristic model is estimated by calculating the relative dispersion value (evaluation value) between the dispersion of the actual datasets $(x_{1i}, x_{2i}, x_{3i}, x_{4i})$ in the CMYK color space (first color space) and the dispersion of the actual datasets $(y_{1i}, y_{2i}, y_{3i})$ in the L*a*b* color space (second color space).

More specifically, the actual data pair evaluation value calculator 54 calculates the relative dispersion value (evaluation value) by executing the following processing.

Figure 8:
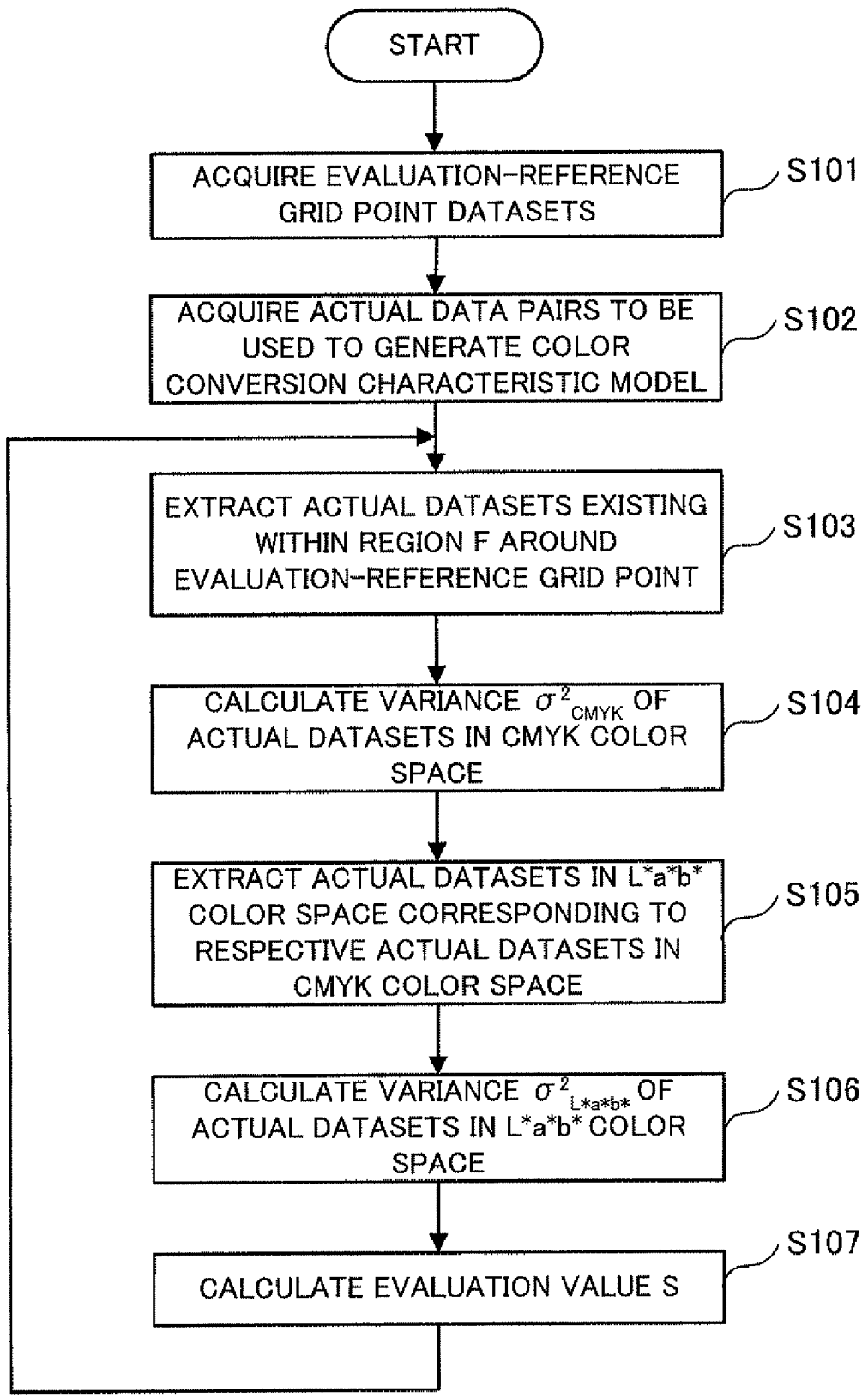
FIG. 8 is a flowchart showing one example of a processing procedure in which the actual data pair evaluation value calculator calculates the relative dispersion value.

FIG. 8 is a flowchart showing one example of a processing procedure in which the actual data pair evaluation value calculator 54 calculates the relative dispersion value. In the first place, the actual data pair evaluation value calculator 54 acquires the evaluation-reference grid point datasets $(C_L, M_L, Y_L, K_L)$ from the evaluation-reference grid point generator 53 (step 101). In addition, the actual data pairs to be used to generate the color conversion characteristic model are acquired from the actual data pair memory 52 (step 102).

Then, from the actual datasets in the CMYK color space acquired from the actual data pair memory 52, the actual data pair evaluation value calculator 54 extracts actual datasets $(x_{1i}, x_{2i}, x_{3i}, x_{4i})$ existing within a region F around one of the evaluation-reference grid points acquired from the evaluation-reference grid point generator 53 (step 103). For instance, the actual datasets $(x_{1i}, x_{2i}, x_{3i}, x_{4i})$ extracted herein are actual datasets existing inside the region F having a color difference distance from the evaluation-reference grid point as a base point. Note that, when the region F around the evaluation-reference grid point is specified, the color difference distance from the evaluation-reference grid point as the base point may be set to be respectively different distances for the coordinate components C, M, Y and K, or to be the same distance for all the coordinate components C, M, Y and K.

Alternatively, in step 103, the actual data pair evaluation value calculator 54 may firstly calculate a color difference distance between each of actual datasets $(x_{1i}, x_{2i}, x_{3i}, x_{4i})$ and the evaluation-reference grid point, and then extract a certain number of actual datasets $(x_{1i}, x_{2i}, x_{3i}, x_{4i})$ in ascending order of the calculated color difference distance.

Figure 9:
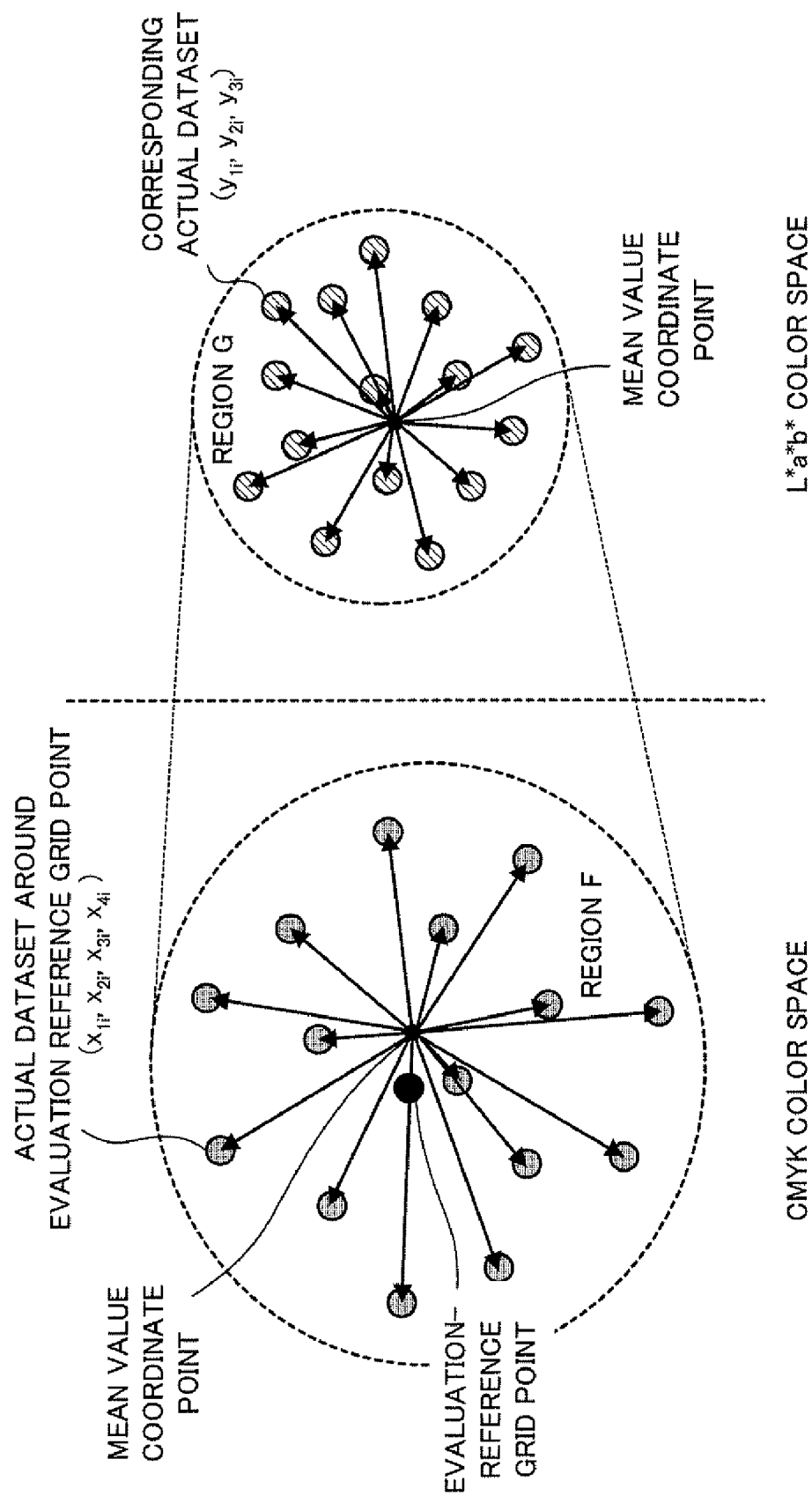
FIG. 9 is a diagram for explaining the actual datasets existing within the region around the evaluation-reference grid point in the CMYK color space and their corresponding actual datasets in the L*a*b* color space.

Here, FIG. 9 is a diagram for explaining the actual datasets $(x_{1i}, x_{2i}, x_{3i}, x_{4i})$ existing within the region F around the evaluation-reference grid point in the CMYK color space and their corresponding actual datasets $(y_{1i}, y_{2i}, y_{3i})$ in the L*a*b* color space. As shown in FIG. 9, the actual datasets $(x_{1i}, x_{2i}, x_{3i}, x_{4i})$ existing within the region F having the evaluation-reference grid point as the base point are extracted in step 103.

Then, the actual data pair evaluation value calculator 54 calculates variance $\sigma^2_{CMYK}$ of the actual datasets $(x_{1i}, x_{2i}, x_{3i}, x_{4i})$ existing within the region F in the CMYK color space extracted in step 103 (step 104). More specifically, the actual data pair evaluation value calculator 54 calculates the variance $\sigma^2_{CMYK}$ for the actual datasets $(x_{1i}, x_{2i}, x_{3i}, x_{4i})$ existing within the region F, by using the following equation (1). Here, in the equation (1), $x_i = x_{1i}, x_{2i}, x_{3i}, x_{4i}$ and $x = x_1, x_2, x_3, x_4$. In addition, mx denotes a mean value of the actual datasets existing within the region F as shown in the following equation (2), and N denotes the number of the actual datasets existing within the region F. A mean value coordinate point shown in FIG. 9 is of color coordinates $(mx_1, mx_2, mx_3, mx_4)$ composed of the mean values of the actual datasets calculated by use of the equation (2).

This variance $\sigma^2_{CMYK}$ calculated in step 104 shows a degree of dispersion of the actual datasets $(x_{1i}, x_{2i}, x_{3i}, x_{4i})$ from the mean value coordinate point in the region F around the evaluation-reference grid point in the CMYK color space.

$$\sigma^2_{CMYK} = \frac{1}{N}\sum_{i=1}^{N}(x_i - mx)^2 \qquad (1)$$

$$mx = \frac{\sum_{i=1}^{N}x_i}{N} \qquad (2)$$

Subsequently, the actual data pair evaluation value calculator 54 extracts the actual datasets $(y_{1i}, y_{2i}, y_{3i})$ in the L*a*b* color space corresponding to the respective actual datasets $(x_{1i}, x_{2i}, x_{3i}, x_{4i})$ within the region F in the CMYK color space that are extracted in step 103 (step 105). The actual datasets $(y_{1i}, y_{2i}, y_{3i})$ extracted in step 105 are assumed to exist within a region G in the L*a*b* color space shown in FIG. 9.

Thereafter, the actual data pair evaluation value calculator 54 calculates a variance $\sigma^2_{L*a*b*}$ of the actual datasets $(y_{1i}, y_{2i}, y_{3i})$ within the region G in the L*a*b* color space (step 106). More precisely, the actual data pair evaluation value calculator 54 calculates the variance $\sigma^2_{L*a*b*}$ of the actual datasets $(y_{1i}, y_{2i}, y_{3i})$ existing within the region G in the L*a*b* color space by use of the following equation (3). Here, in the equation (3), $y_i = y_{1i}, y_{2i}, y_{3i}$ and $y = y_1, y_2, y_3$. In addition, my denotes a mean value of the actual datasets existing within the region C as shown in the following equation (4); and N denotes the number of the actual datasets existing within the region G, and represents the same number as the number of the actual datasets existing within the region F. A mean value coordinate point shown in FIG. 9 is of color coordinates $(my_{1i}, my_{2i}, my_{3i})$ composed of the mean values of the actual datasets calculated by use of the equation (4).

This variance $\sigma^2_{L*a*b*}$ calculated in step 106 shows a degree of dispersion of the actual datasets $(y_{1i}, y_{2i}, y_{3i})$ from the mean value coordinate point in the region G in the L*a*b* color space corresponding to the region F around the evaluation-reference grid point in the CMYK color space.

$$\sigma^2_{L*a*b*} = \frac{1}{N}\sum_{i=1}^{N}(y_i - my)^2 \qquad (3)$$

$$my = \frac{\sum_{i=1}^{N}y_i}{N} \qquad (4)$$

Subsequently, based on the variance $\sigma^2_{CMYK}$ calculated in step 104 and the variance $\sigma^2_{L*a*b*}$ calculated in step 106, the actual data pair evaluation value calculator 54 calculates a relative ratio (relative dispersion value) of the variance $\sigma^2_{L^*a^*b^*}$ of the actual datasets in the L*a*b* color space with respect to the variance $\sigma^2_{CMYK}$ of the actual datasets in the CMYK color space. Then, the calculated relative variance value is set as an evaluation value S for actual data pairs used to generate the color conversion characteristic model. In essence, the actual data pair evaluation value calculator 54 calculates the evaluation value S for the actual data pairs by use of the following equation (5) (step 107).

This evaluation value S is the estimation representing what kind of error occurs on the color conversion characteristic model due to the actual data pairs used to generate the color conversion characteristic model, as described above.

$$S = \frac{\sigma^2_{L^*a^*b^*}}{\sigma^2_{CMYK}} \quad (5)$$

Thereafter, the actual data pair evaluation value calculator 54 transmits the evaluation value S calculated in step 107 to the evaluation value output portion 55 while associating the evaluation value S with the calculated evaluation-reference grid point dataset ($C_L$, $M_L$, $Y_L$, $K_L$). In addition, after the calculation of the evaluation value S in step 107, the next evaluation reference grid point is selected from the evaluation-reference grid points acquired in step 101, and the evaluation value S is similarly calculated for the region F around the next evaluation-reference grid point. The actual data pair evaluation value calculator 54 calculates the evaluation values S for all the regions F around the evaluation-reference grid points in this way.

Thereafter, the evaluation value output portion 55 outputs the evaluation values S, which are associated with the respective evaluation-reference grid point datasets ($C_L$, $M_L$, $Y_L$, $K_L$), to the color conversion characteristic model generator 20. After receiving the evaluation values S, the color conversion characteristic model generator 20 adjusts the setting values of parameters (weight) to be assigned to the actual data pairs when generating the color conversion characteristic model, for every region (the region F around each of the evaluation-reference grid points) in the color space where the grid point datasets of the conversion source color exist.

In other words, use of the evaluation value S calculated by the actual data evaluator 50 allows model error caused by the generated color conversion characteristic model to be predicted for every region in the color space. Hence, in terms of the actual data pairs used to generate the color conversion characteristic model, the actual data pairs are evaluated for every region in the color space from the viewpoint of the influence on the color conversion accuracy of the color conversion characteristic model generated based on these actual data pairs.

Figure 10:
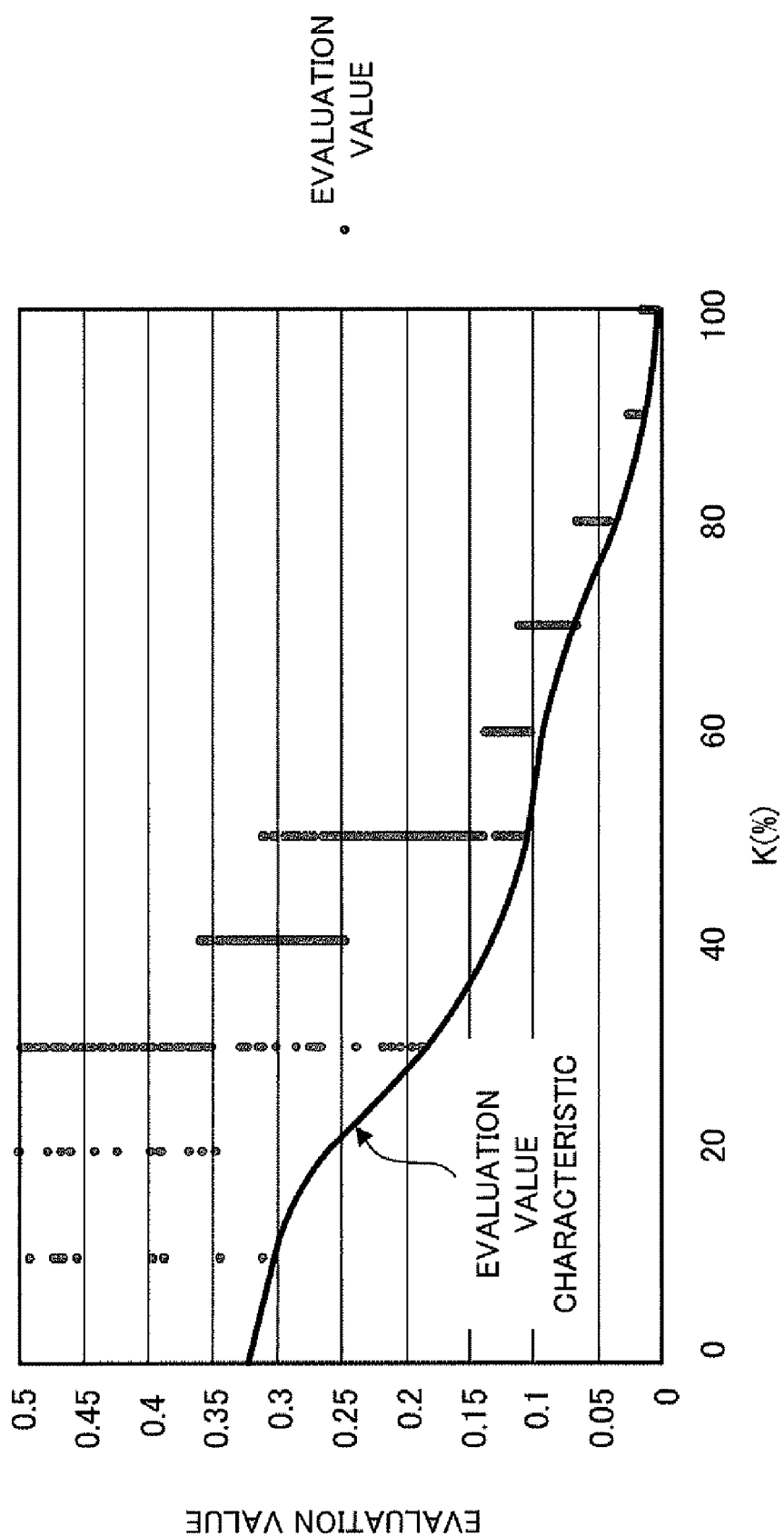
FIG. 10 shows the evaluation values for an image forming apparatus.
Figure 11:
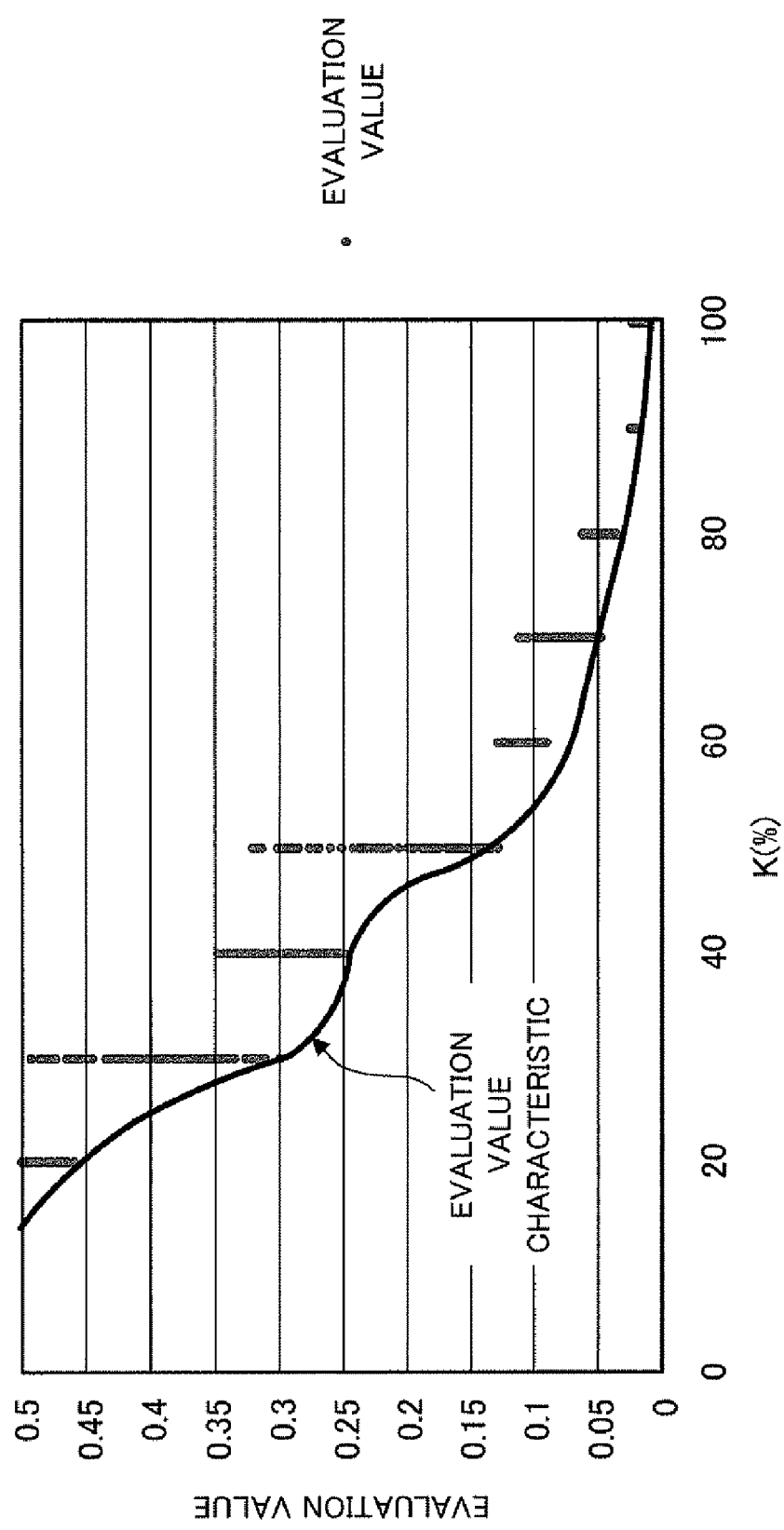
FIG. 11 shows the evaluation values for another image forming apparatus having a color conversion characteristic different from that of the image forming apparatus of FIG. 10.

Here, each of FIGS. 10 and 11 is a graph showing one example of the evaluation values S that are outputted from the evaluation value output portion 55 to the color conversion characteristic model generator 20 in association with the evaluation-reference grid point dataset ($C_L$, $M_L$, $Y_L$, $K_L$). In each of FIGS. 10 and 11, the CMYK color space is divided into regions based on the K coordinate value ($K_L$) of the evaluation-reference grid point dataset ($C_L$, $M_L$, $Y_L$, $K_L$), and a relationship between each region in the CMYK color space, which has the same K coordinate value ($K_L$) and the corresponding evaluation values S is shown. FIG. 10 shows the evaluation values S for an image forming apparatus (printer) A, whereas FIG. 11 shows the evaluation values S for another image forming apparatus (printing machine) B having a color conversion characteristic different from that of the image forming apparatus A.

As show in FIGS. 10 and 11, the actual data evaluator 50 generates actual datasets, which are to be used by the color processor 1 equipped in each of the image forming apparatuses to generate the color conversion characteristic model, for each of regions into which the CMYK color space is divided based on the K coordinate value ($K_L$), for example. Then, the actual data evaluator 50 expresses, as an evaluation value characteristic, a relationship between the evaluation value S and a coverage value (an image area ratio % of K color) that is a K coordinate value ($K_L$) in the CMYK color space, and outputs the evaluation value characteristic to the color conversion characteristic model generator 20.

Incidentally, in the case of the actual data evaluator 50 of the present exemplary embodiment, the evaluation value characteristic is expressed by use of the smallest value among the evaluation values S for each K coordinate value ($K_L$). Alternatively, the evaluation value characteristic may be expressed by use of the greatest value among the evaluation values S for each of the K coordinate value ($K_L$). Moreover, the evaluation value characteristic may be expressed by use of the mean value of the evaluation values S for each of the K coordinate values ($K_L$). In essence, the evaluation value characteristic may be expressed in any method, as long as the method allows the evaluation values S for each of the K coordinate values ($K_L$) to be objectively expressed.

Figure 12:
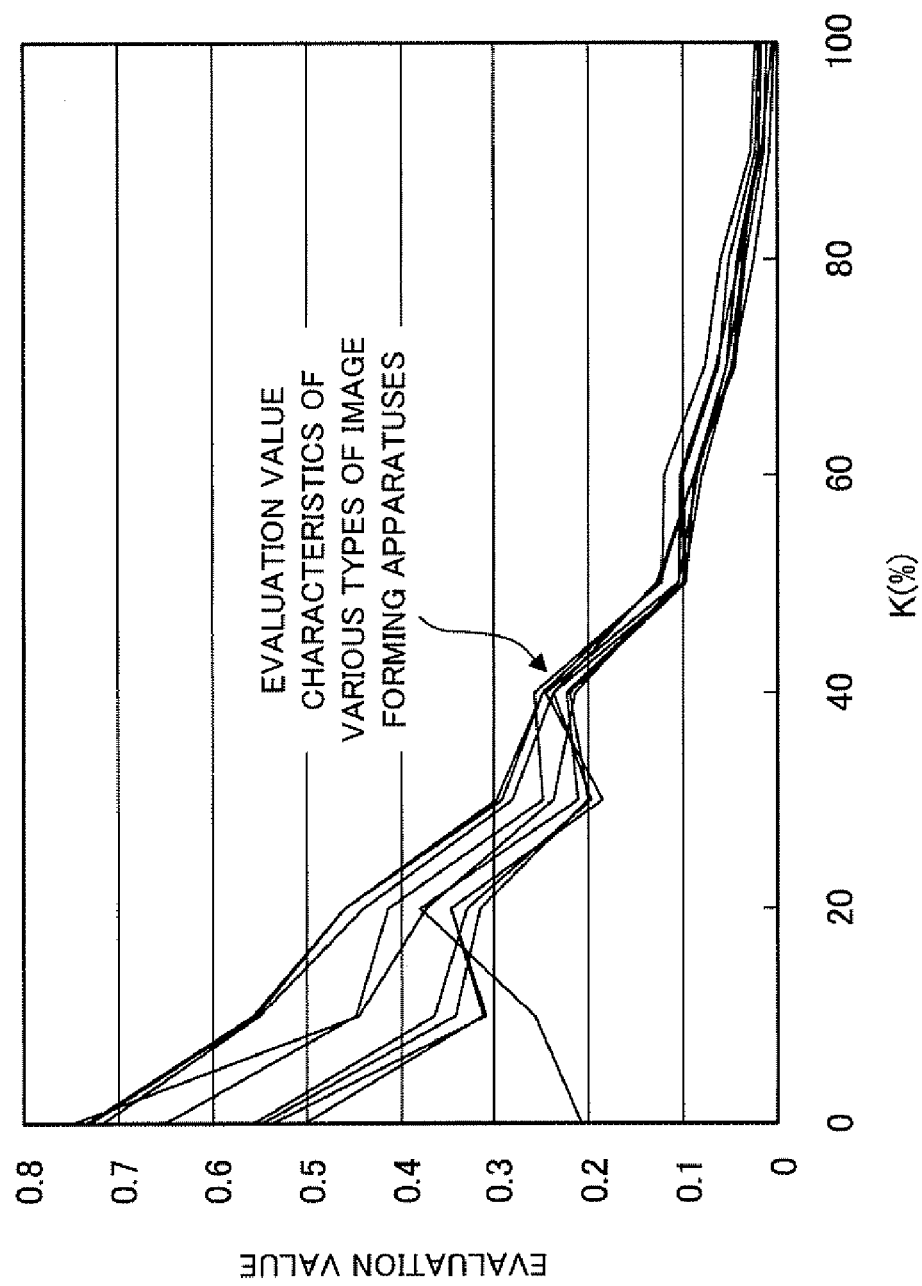
FIG. 12 is a graph showing the evaluation value characteristics according to the evaluation values of various types of image forming apparatuses.

The following drawing, FIG. 12 is a graph showing the evaluation value characteristics according to the evaluation values S of various types of image forming apparatuses. These image forming apparatuses use different actual data pairs, and also use different measurement devices of measuring the colors of the actual datasets. Moreover, the device configuration, the operation setting condition, the property of a used developer, and the like differ among these image forming apparatuses. As a result, as shown in FIG. 12, the image forming apparatuses have different evaluation value characteristics, respectively. For this reason, when generating the color conversion characteristic model, the color processor 1 equipped in each of the image forming apparatuses generates the color conversion characteristic model according to the evaluation value characteristic of the actual data pairs used by itself.

Incidentally, although the actual data evaluator 50 calculates the evaluation value S by use of the variance $\sigma^2_{CMYK}$ of the actual datasets in the CMYK color space and the variance $\sigma^2_{L^*a^*b^*}$ of the actual datasets in the L*a*b* color space in the present exemplary embodiment, these variances may not be necessarily used for the calculation of the evaluation value S. Instead, the evaluation value S may be calculated by use of any other factor as long as the factor allows the appropriate evaluation of the color conversion accuracy of the color conversion characteristic model generated based on the actual data pairs.

Next, the color conversion characteristic model generator 20 of the present exemplary embodiment will be described in detail.

Figure 13:
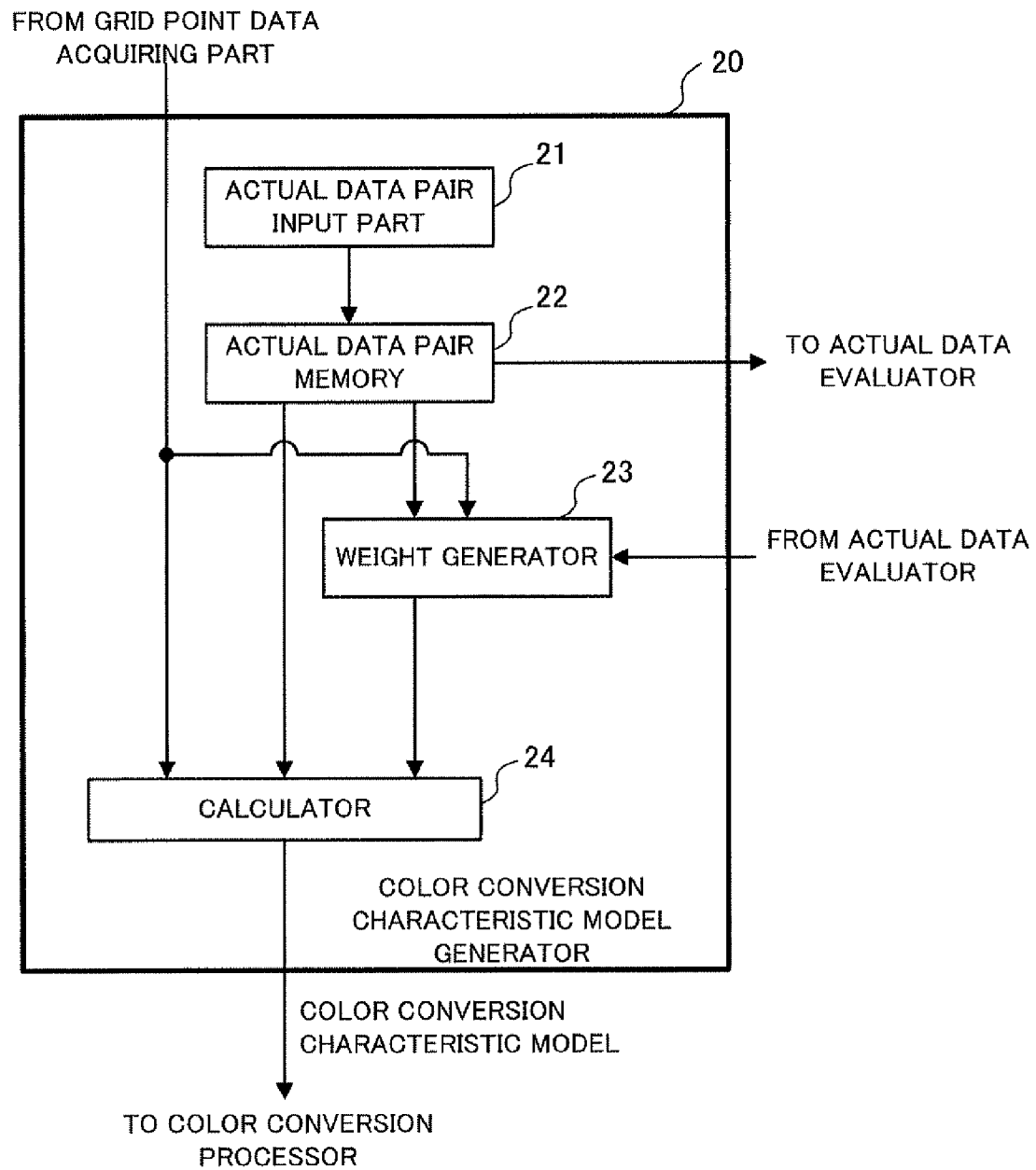
FIG. 13 is a block diagram showing a functional configuration of the color conversion characteristic model generator.

FIG. 13 is a block diagram showing a functional configuration of the color conversion characteristic model generator 20. The color conversion characteristic model generator 20 includes an actual data pair input part 21, an actual data pair memory 22, a weight generator 23 and a calculator 24.

The actual data pair input part 21 is one example of the color data pair acquiring part, and acquires actual data pairs (color data pairs) each composed of: a color dataset ($x_{1i}$, $x_{2i}$, $x_{3i}$, $x_{4i}$) of one of the color samples (color patches) generated by combining various color coordinate values in the color space (first color space, that is, the CMYK color space) of the grid point dataset inputted from the grid point data acquiring part 10; and a color dataset ($y_{1i}, y_{2i}, y_{3i}$) obtained by actually measuring (the color of) the color patch in the conversion destination color space (the second color space, that is, the L*a*b* color space).

The actual data pair memory 22 stores the actual data pairs inputted from the actual data pair input part 21. Specifically, the actual data pair memory 22 stores n actual data pairs each composed of: the actual datasets ($x_{1i}, x_{2i}, x_{3i}, x_{4i}$) of the color patches expressed in the CMYK color space and their corresponding actual datasets ($y_{1i}, y_{2i}, y_{3i}$) in the L*a*b* color space. Here, n and i are integers where i=1 to n. The foregoing actual data pair acquiring portion 51 in the actual data evaluator 50 acquires the actual data pairs from this actual data pair memory 22.

The weight generator 23 is one example of a functional unit constituting a part of the color conversion characteristic model calculator, and generates weight to be assigned to the actual datasets when the color conversion characteristic model is figured out through statistical processing, such as regression analysis, using the actual datasets. In order to generate the inverse color conversion characteristic model, the weight generator 23 controls the weight assignment to the actual data pairs for every region in the L*a*b* color space, by adjusting the weight to be assigned to the actual data pairs on the basis of the evaluation value S acquired from the actual data evaluator 50, as described later.

The calculator 24 is one example of a functional unit constituting a part of the color conversion characteristic model calculator, and calculates both of the normal and inverse color conversion characteristic models in both directions through the statistical processing, such as regression analysis. Here, the calculated normal and inverse color conversion characteristic models specify the correspondences between the color datasets in the CMYK color space and the color datasets in the L*a*b* color space. More precisely, the calculator 24 acquires the grid point datasets from the grid point data acquiring part 10, and the actual data pairs from the actual data pair memory 22. In addition, from the weight generator 23, the calculator 24 acquires the weight according to the color difference distance from the grid point dataset. The calculator 24 assigns the weight, which is generated by the weight generator 23, to the actual datasets acquired from the actual data pair memory 22, and then performs linear regression analysis using the weighted actual datasets. Thereby, the calculator 24 calculates the normal color conversion characteristic model that specifies the correspondence between the colors (grid point datasets) in the first color space and the colors (converted color datasets) in the second color space corresponding to the acquired colors in the first color space. In addition, the calculator 24 calculates the inverse color conversion characteristic model that specifies the correspondence between the colors (grid point datasets) in the second color space and the colors (converted color datasets) in the first color space corresponding to the acquired colors in the second color space. After that, the calculator 24 transmits both of the calculated normal and inverse color conversion characteristic models in both directions to the color conversion processor 30.

Next, the generation of the color conversion characteristic models in the color conversion characteristic model generator 20 will be described. Firstly, the description will be given for the case of generating the normal color conversion characteristic model with which the color dataset (C, M, Y, K), as a first color signal, in the four-dimensional CMYK color space is converted into the color dataset (L*, a*, b*), as a second color signal, in the three-dimensional L*a*b* color space.

When the grid point datasets inputted into the grid point data acquiring part 10 are four-dimensional datasets in the CMYK color space (first color space) whereas the converted color datasets outputted after the color conversion processing in the color conversion processor 30 are three-dimensional datasets in the L*a*b* color space (second color space), n actual datasets ($x_{1i}, x_{2i}, x_{3i}, x_{4i}$) in the CMYK color space and their corresponding converted output values ($y'_{1i}, y'_{2i}, y'_{3i}$) in the L*a*b* color space are associated with each other by using a matrix $M_i$ of the following equation (7) having elements $m_{11}, m_{12}, m_{13}, m_{14}, \ldots$ that each include constant terms to form linear relations, as shown in the following equation (6). Thus, the color conversion characteristic model generator 20 figures out, as the normal color conversion characteristic model, the matrix Mi of the equation (7) that allows the converted output value ($y'_{1i}, y'_{2i}, y'_{3i}$) calculated by the equation (6) to approximate, as much as possible, the actual dataset ($y_{1i}, y_{2i}, y_{3i}$) in the L*a*b* color space, which is paired with the actual dataset ($x_{1i}, x_{2i}, x_{3i}, x_{4i}$) in the CMYK color space.

$$\begin{pmatrix} y'_{1i} \\ y'_{2i} \\ y'_{3i} \end{pmatrix} = \begin{pmatrix} m_{11} & m_{12} & m_{13} & m_{14} & m_{15} \\ m_{21} & m_{22} & m_{23} & m_{24} & m_{25} \\ m_{31} & m_{32} & m_{33} & m_{34} & m_{35} \end{pmatrix} \begin{pmatrix} x_{1i} \\ x_{2i} \\ x_{3i} \\ x_{4i} \\ 1 \end{pmatrix} \quad (6)$$

$$M_i = \begin{pmatrix} m_{11} & m_{12} & m_{13} & m_{14} & m_{15} \\ m_{21} & m_{22} & m_{23} & m_{24} & m_{25} \\ m_{31} & m_{32} & m_{33} & m_{34} & m_{35} \end{pmatrix} \quad (7)$$

Figure 14:
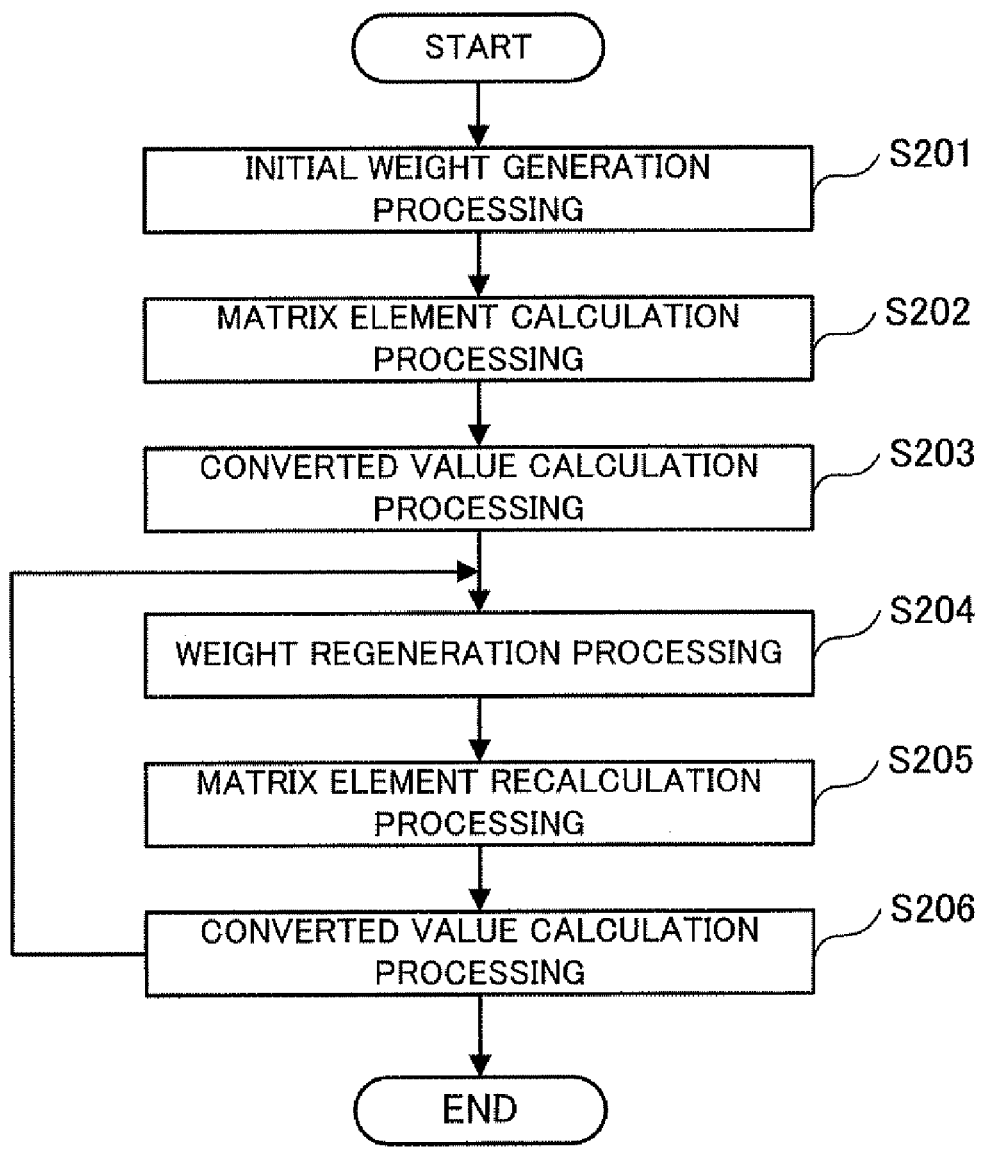
FIG. 14 is a flowchart showing one example of a processing procedure for generating the color conversion characteristic model in the color conversion characteristic model generator.

FIG. 14 is a flowchart showing one example of a processing procedure for generating the color conversion characteristic model in the color conversion characteristic model generator 20. As shown in FIG. 14, in the processing for generating the color conversion characteristic model in the color conversion characteristic model generator 20, an initial weight generation processing (step 201), a matrix element calculation processing (step 202), a converted value calculation processing (step 203), a weight regeneration processing (step 204), a matrix element recalculation processing (step 205) and a converted value calculation processing (step 206) are executed.

[Initial Weight Generation Processing]

To begin with, in the color conversion characteristic model generator 20, the weight generator 23 performs an initial weight generation processing for generating an initial weight $W'_{ij}$ (step 201). The weight generator 23 acquires each grid point dataset ($x_{1j}, x_{2j}, x_{3j}, x_{4j}$), which represents a conversion source color, from the grid point data acquiring part 10, and actual datasets ($x_{1i}, x_{2i}, x_{3i}, x_{4i}$) in the CMYK color space from the actual data pair memory 22. Then, the weight generator 23 normalizes the difference between each of the signal components of the grid point dataset ($x_{1j}, x_{2j}, x_{3j}, x_{4j}$) and the corresponding signal component of each of the actual datasets ($x_{1i}, x_{2i}, x_{3i}, x_{4i}$), and generates the initial weight $W'_{ij}$ set as a first function $F_{ij}$ shown in the later-described equation (10). This first function Fij monotonously decreases according to the Euclidean distances with respect to a normalized signal including these normalized difference components. Note that, $x_{10}, x_{20}, x_{30}, x_{40}$ in the equation (10) are normalization constants, and specify a width of the initial weight $W'_{ij}$ according to the respective Euclidean distances. Thus, the normalization constants $x_{10}$, $x_{20}$, $x_{30}$, $x_{40}$ are one example of parameters for adjusting the weight to be assigned to the actual datasets.

[Matrix Element Calculation Processing]

In the matrix element calculation processing (step 202) subsequent to the initial weight generation processing (step 201), the calculator 24 performs a processing for figuring out each of the elements $m_{11}, m_{12}, m_{13}, m_{14}, \ldots$ in the matrix $M_i$ of the equation (6).

The calculator 24 acquires each grid point dataset ($x_{1j}$, $x_{2j}$, $x_{3j}$, $x_{4j}$) from the grid point data acquiring part 10. In addition, the calculator 24 acquires the actual datasets ($x_{1i}$, $x_{2i}$, $x_{3i}$, $x_{4i}$) in the CMYK color space and their corresponding actual datasets ($y_{1i}$, $y_{2i}$, $y_{3i}$) in the L*a*b* color space from the actual data pair memory 22. Moreover, the calculator 24 acquires the initial weight $W'_{ij}$ from the weight generator 23.

Thereafter, the calculator 24 figures out each of the elements $m_{11}, m_{12}, m_{13}, m_{14}, \ldots$ in the matrix $M_i$ of the equation (6) by use of the least squares method, which is one example of the linear regression analysis. The elements $m_{11}, m_{12}, m_{13}, m_{14}, \ldots$ are figured out here under the condition of minimizing the square sum $E_j$ (the following equation (8)) that is obtained by multiplying the initial weight $W'_{ij}$ generated in the initial weight generation processing (step 201) by the Euclidean distances between the converted output values ($y'_{1i}$, $y'_{2i}$, $y'_{3i}$) calculated by the equation (6) and the actual dataset ($y_{1i}$, $y_{2i}$, $y_{3i}$) in the L*a*b* color space that is paired with the actual dataset ($x_{1i}$, $x_{2i}$, $x_{3i}$, $x_{4i}$) in the CMYK color space used to generate the converted output values ($y'_{1i}$, $y'_{2i}$, $y'_{3i}$) by the equation (6). In the matrix element calculation processing (step 202), these matrix elements are calculated with the initial weight $W'_{ij}$ instead of a weight $W_{ij}$ in the equation (8).

$$E_j = \sum_{i=0}^{n} (W_{ij}^2 ((y'_{1i} - y_{1i})^2 + (y'_{2i} - y_{2i})^2 + (y'_{3i} - y_{3i})^2)) \quad (8)$$

[Converted Value Calculation Processing]

In the following converted value calculation processing (step 203), the calculator 24 calculates the converted color dataset ($y_{1j}$, $y_{2j}$, $y_{3j}$) from the grid point dataset ($x_{1j}$, $x_{2j}$, $x_{3j}$, $x_{4j}$) inputted to the grid point data acquiring part 10, by using the elements $m_{11}, m_{12}, m_{13}, m_{14}, \ldots$ in the matrix $M_i$ calculated in the matrix element calculation processing in step 202 and the following equation (9).

$$\begin{pmatrix} y_{1j} \\ y_{2j} \\ y_{3j} \end{pmatrix} = \begin{pmatrix} m_{11} & m_{12} & m_{13} & m_{14} & m_{15} \\ m_{21} & m_{22} & m_{23} & m_{24} & m_{25} \\ m_{31} & m_{32} & m_{33} & m_{34} & m_{35} \end{pmatrix} \begin{pmatrix} x_{1j} \\ x_{2j} \\ x_{3j} \\ x_{4j} \\ 1 \end{pmatrix} \quad (9)$$

[Weight Regeneration Processing]

In the following weight regeneration processing (step 204), the weight generator 23 regenerates the weight $W_{ij}$. Here, the weight generator 23 uses a second function $G_{ij}$ (the equation (11)) in addition to the first function $F_{ij}$ (the equation (10)) used to generate the initial weight $W'_{ij}$ in the initial weight generation processing in step 201.

In the first function $F_{ij}$, the difference between each of the signal components of the grid point dataset ($x_{1j}$, $x_{2j}$, $x_{3j}$, $x_{4j}$) as a conversion source and the corresponding signal component of each of the actual datasets ($x_{1i}$, $x_{2i}$, $x_{3i}$, $x_{4i}$) is normalized as similar to the initial weight generation processing (step 201). Then, a first weight $W_{1ij}$ is set by using the first function $F_{ij}$. This first weight $W_{1ij}$ monotonously decreases according to the Euclidean distances with respect to a normalized signal including these normalized difference components. Note that, $x_{10}$, $x_{20}$, $x_{30}$, $x_{40}$ in the equation (10) used in the weight regeneration processing (step 204) are normalization constants, and specify a width of the first weight $W_{1ij}$ according to the respective Euclidean distances. In other words, the normalization constants $x_{10}$, $x_{20}$, $x_{30}$, $x_{40}$ herein are similarly one example of parameters for adjusting the weight to be assigned to the actual datasets.

In the second function $G_{ij}$, the difference between each of the signal components of the grid point dataset ($x_{1j}$, $x_{2j}$, $x_{3j}$, $x_{4j}$) and the corresponding signal component of each of the actual datasets ($x_{1i}$, $x_{2i}$, $x_{3i}$, $x_{4i}$) is converted into a difference component whose sensitivity is added by using its corresponding element in the matrix Mi of the equation (9). Then, these difference components are normalized. Thereafter, a second weight $W_{2ij}$ is set by using the second function $G_{ij}$. This second weight $W_{2ij}$ monotonously decreases according to the Euclidean distances with respect to a normalized signal including these difference components whose sensitivities are added by use of their corresponding elements in the matrix $M_i$. Note that, $y_{10}$, $y_{20}$, $y_{30}$ in the equation (11) are normalization constants, and specify a width of the second weight $W_{2ij}$ according to the respective Euclidean distances. Thus, the normalization constants $y_{10}$, $y_{20}$, $y_{30}$ are one example of parameters for adjusting the weight to be assigned to the actual datasets.

After that, the weight generator 23 generates the weight Wij in which the first weight $W_{1ij}$ and the second weight $W_{2ij}$ are combined with each other, as shown in an equation (12).

In the weight regeneration processing (step 204) according to this manner, the weight $W_{ij}$ is set by use of the first function $F_{ij}$ and the second function $G_{ij}$ that are the two monotonously decreasing functions with respect to the Euclidean distances between the color datasets (color coordinate points). Thereby, a lighter weight $W_{ij}$ is assigned to an actual dataset having a larger distance (color difference distance) from the grid point dataset in the color space to reduce the influence of the actual dataset, while a heavier weight $W_{ij}$ is assigned to an actual dataset having a smaller color difference from the grid point dataset in the color space to treat the actual dataset as important data. In short, the weight $W_{ij}$ sets the weight assignment to the actual data pairs according to the color difference distance.

$$W_{1ij} = F_{ij}(((x_{1i} - x_{1j})/x_{10})^2 + ((x_{2i} - x_{2j})/x_{20})^2 + \quad (10)$$
$$((x_{3i} - x_{3j})/x_{30})^2 + ((x_{4i} - x_{4j})/x_{40})^2)$$

$$W_{2ij} = G_{ij}(((m_{11}(x_{1i} - x_{1j}))^2 + (m_{12}(x_{2i} - x_{2j}))^2 + \quad (11)$$
$$(m_{13}(x_{3i} - x_{3j}))^2 + (m_{14}(x_{4i} - x_{4j}))^2)/(y_{10})^2 +$$
$$((m_{21}(x_{1i} - x_{1j}))^2 + (m_{22}(x_{2i} - x_{2j}))^2 + (m_{23}(x_{31} - x_{3j}))^2 +$$
$$(m_{24}(x_{4i} - x_{4j}))^2)/(y_{20})^2 +$$
$$((m_{31}(x_{1i} - x_{1j}))^2 + (m_{32}(x_{2i} - x_{2j}))^2 + (m_{33}(x_{3i} - x_{3j}))^2 +$$
$$(m_{34}(x_{4i} - x_{4j}))^2)/(y_{30})^2)$$

$$W_{ij} = H(W_{1ij}, W_{2ij}) \quad (12)$$

Figure 15:
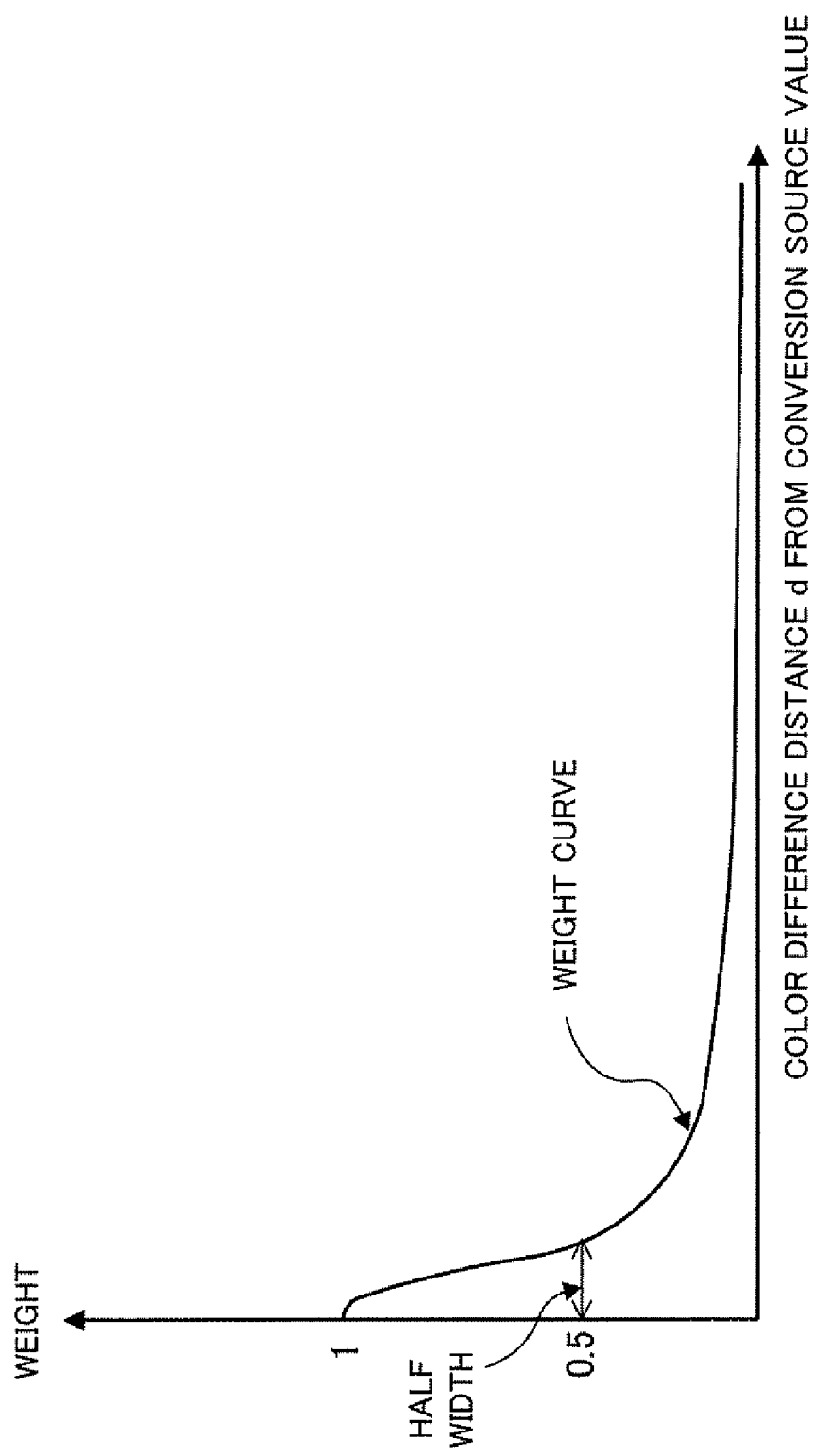
FIG. 15 is a graph showing one example of the weight set by the equation (13), for example.

Here, the following equation (13) is used as one specific example of the monotonously decreasing functions, used as the first function $F_{ij}$ and the second function $G_{ij}$, with respect to the Euclidean distances between the color datasets (color coordinate points). In addition, FIG. 15 is a graph showing one example of the weight set by the equation (13), for example. In the initial weight generation processing (step 201) and the weight regeneration processing (step 204), the weight according to a color difference distanced from a conversion source color (grid point dataset) as shown in FIG. 15 is set in the weight generator 23. For example, "the width of the weight" specified by the foregoing normalization constants is specified as a value of 2× a half width of the weight curve shown in FIG. 15.

$$F_{ij}(X) = G_{ij}(X) = \frac{1}{1+X^2} \quad (13)$$

[Matrix Element Recalculation Processing]

In the following matrix element recalculation processing (step 205), the calculator 24 recalculates the elements $m_{11}$, $m_{12}$, $m_{13}$, $m_{14}$, ... in the matrix $M_i$ of the equation (6) by use of the least squares method that is one example of the linear regression analysis. Here, the elements $m_{11}$, $m_{12}$, $m_{13}$, $m_{14}$, ... are recalculated under the condition of minimizing the square sum $E_j$ (the equation (8)) that is obtained by multiplying the weight $W_{ij}$ generated in the weight regeneration processing (step 204) by the Euclidean distances between the converted output values ($y'_{1i}$, $y'_{2i}$, $y'_{3i}$) calculated by the equation (6) and the actual datasets ($y_{1i}$, $y_{2i}$, $y_{3i}$) in the L*a*b* color space that are paired with the actual datasets ($x_{1i}$, $x_{2i}$, $x_{3i}$, $x_{4i}$) in the CMYK color space used to calculate the converted output values ($y'_{1i}$, $y'_{2i}$, $y'_{3i}$) through the equation (6).

However, when the weight $W_{ij}$ is dependent on the elements in the matrix $M_i$ or the color dataset in the L*a*b* color space that is the conversion destination color, the elements $m_{11}$, $m_{12}$, $m_{13}$, $m_{14}$, ... in the matrix $M_i$ are not uniquely determined. In such a case, the optimum values of the weight $W_{ij}$ the elements $m_{11}$, $m_{12}$, $m_{13}$, $m_{14}$, ... in the matrix $M_i$, and the conversion destination color are determined by use of an iterative approximation method under the condition of minimizing $E_j$ in the equation (8).

[Converted Value Calculation Processing]

In the converted value calculation processing (step 206) subsequent to the matrix element recalculation processing (step 205), the calculator 24 calculates the converted color dataset ($y_{1j}$, $y_{2j}$, $y_{3j}$) from the grid point dataset ($x_{1j}$, $x_{2j}$, $x_{3j}$, $x_{4j}$) that is the conversion source color, on the basis of the equation (9) using the matrix $M_i$ of the equation (7) figured out in the matrix element recalculation processing (step 205). In addition, the calculator 24 transmits the calculated converted color dataset ($y_{1j}$, $y_{2j}$, $y_{3j}$) to the weight generator 23. The weight generator 23 recalculates the weight $W_{ij}$ in reference to the converted color dataset ($y_{1j}$, $y_{2j}$, $y_{3j}$) calculated by the calculator 24. Then, the calculator 24 figures out the matrix $M_i$ composed of the elements $m_{11}$, $m_{12}$, $m_{13}$, $m_{14}$, ... that minimize $E_j$ in the equation (8). The calculator 24 recalculates the converted color dataset ($y_{1j}$, $y_{2j}$, $y_{3j}$) by use of this matrix $M_i$. In this way, the color conversion characteristic model generator 20 iteratively executes the processing from the weight regeneration processing in step 204 to the converted value calculation processing in step 206 to converge the converted color dataset ($y_{1j}$, $y_{2j}$, $y_{3j}$), and consequently obtains the matrix $M_i$ with high accuracy.

Then, the calculator 24 sets the obtained matrix $M_i$ of the equation (7) as the normal color conversion characteristic model in the color conversion processor 30. Thereby, based on the equation (9), the color conversion processor 30 calculates the converted color dataset ($y_{1j}$, $y_{2j}$, $y_{3j}$) that is the conversion destination color, from the grid point dataset ($x_{1j}$, $x_{2j}$, $x_{3j}$, $x_{4j}$) that is the conversion source color inputted to the grid point data acquiring part 10.

Hereinbelow, the description will be given for the case of generating the inverse color conversion characteristic model with on which a color dataset (L*, a*, b*) in the three-dimensional L*a*b* color space representing a conversion source color is converted into a color dataset (C, M, Y, K) in the four-dimensional CMYK color space representing a conversion destination color, through the processing shown in the aforementioned flowchart in FIG. 14.

In order to generate the inverse color conversion characteristic model used to convert the grid point dataset in the L*a*b* color space into the converted color dataset in the CMYK color space, the foregoing equation (9) is inversely solved (an inverse operation is performed), In this case, however, in the equation (9), the three-dimensional grid point dataset ($y_{1j}$, $y_{2j}$, $y_{3j}$) represents the conversion source color while the four-dimensional converted color dataset ($x_{1j}$, $x_{2j}$, $x_{3j}$, $x_{4j}$) represents the conversion destination color. This indicates that the inverse operation of the equation (9) does not lead to a unique solution due to the lack of a known number. Therefore, in this case, a part of the converted color dataset, for example, ($x_{4j}$) is set as the conversion source color, and then the equation (9) is inversely solved to figure out the remaining part of the converted color dataset, for example, ($x_{1j}$, $x_{2j}$, $x_{3j}$). Specifically, one general method therefor is to firstly calculate the value of "K" in the CMYK color space. Examples of such general method to be used therefor include a method in which a K coordinate value in the CMYK color space is designed in advance corresponding to each color dataset (L*, a*, b*) in the L*a*b* color space, and a method in which a color dataset (L*, a*, b*) and a K coordinate value are directly given as an input signal (a conversion source color).

Here, in the case where the processing does not include the processing of calculating the K coordinate value in the CMYK color space from the color dataset (L*, a*, b*) in the L*a*b* color space, the conversion source color is represented by the color dataset (L*, a*, b*) in the three-dimensional L*a*b* color space while the conversion destination color is represented by the color dataset (C, M, Y) in the three-dimensional CMY color space. Hence, a second color signal is generated through the inverse operation of the equation (9). In this case, the grid point dataset (L*, a*, b*, K) is inputted to the grid point data acquiring part 10 in FIG. 1, and the converted color dataset (C, M, Y, K) in the second color space (CMYK color space) is outputted from the color conversion processor 30 in FIG. 1.

Then, in this case, the weight generator 23 in the color conversion characteristic model generator 20 generates a weight $w_{ij}$ in the L*a*b* color space. For example, in the weight regeneration processing (step 204) in FIG. 14, the differences between the signal components of the grid point dataset ($y_{1j}$, $y_{2j}$, $y_{3j}$) that is the conversion source color and the corresponding signal components of each of the actual datasets ($y_{1i}$, $y_{2i}$, $y_{3i}$) in the L*a*b* color space are normalized, and then a second weight $w_{2ij}$ is set by use of a second function $G_{ij}$ that is a monotonously-decreasing function for the Euclidean distances with respect to the obtained normalized signal, as shown in the following equation (14). Thereafter, as shown in the following equation (15), the difference between one of the signal components in the converted color dataset ($x_{1j}$, $x_{2j}$, $x_{3j}$, $x_{4j}$), for example, ($X_{4j}$) (="K") and its corresponding signal component of the actual dataset ($X_{4i}$) is normalized, and then a first weight $w_{1ij}$ is set by use of a first function $F_{ij}$ that is a monotonously-decreasing function for the Euclidean distance with respect to the normalized signal obtained from the difference component of the converted color dataset ("K") After that, the weight generator 23 combines the first weight $w_{1ij}$ and the second weight $w_{2ij}$ with a function H shown in the equation (16) to generate the weight $w_{ij}$. Moreover, the weight generator 23 also generates the initial weight $w'_{ij}$ in the initial weight generation processing (step 201) in the same manner.

$$w_{2ij} = G_{ij}(((y_{1i}-y_{1j})/y_{10})^2 + ((y_{2i}-y_{2j})/y_{20})^2 + ((y_{3i}-y_{3j})/y_{30})^2) \quad (14)$$

$$w_{1ij} = F_{ij}(((x_{4i}-x_{4j})/x_{40})^2) \quad (15)$$

$$w_{ij} = H(w_{1ij}, w_{2ij}) \quad (16)$$

Next, in the matrix element recalculation processing in step 205, the linear regression analysis is performed by using the actual datasets to which the weight $w_{ij}$ of the equation (16) is assigned. Through this regression analysis, an inverse matrix $M_i^{-1}$ (the inverse color conversion characteristic model) to be used to perform the inverse operation of the equation (9) is calculated. Similarly, in the matrix element calculation processing in step 202 in FIG. 14, the linear regression analysis is performed on the actual datasets to which the weight $w_{ij}$ of the equation (16) is assigned.

Here, note that, $y_{10}$, $y_{20}$, $y_{30}$ in the equation (14) are normalization constants, and specify the width of the second weight $w_{2ij}$ according to the respective Euclidean distances. Moreover, $x_{40}$ in the equation (15) is also a normalization constant, and specifies the width of the first weight $w_{1ij}$ according to the Euclidean distance. Thus, the normalization constants $y_{10}$, $y_{20}$, $y_{30}$, $x_{40}$ are one example of parameters for adjusting the weight to be assigned to the actual datasets.

Next, the description will be provided for the width of the weight that is set when the weight is assigned to the actual datasets in the initial weight generation processing (step 201) and the weight regeneration processing (step 204) in order for the color conversion characteristic model generator 20 to generate the inverse color conversion characteristic model.

As described above, from the actual data evaluator 50, the color conversion characteristic model generator 20 acquires the evaluation value S associated with the evaluation-reference grid point dataset, as the evaluation value characteristic (see FIGS. 10 to 12). This evaluation value characteristic generated based on the evaluation values S by the actual data evaluator 50 is a factor indicating an evaluation of the actual data pairs for every region in the color space from the viewpoint of the influence on the color conversion accuracy of the color conversion characteristic model. Accordingly, when generating the inverse color conversion characteristic model, the color conversion characteristic model generator 20 adjusts the setting values of the parameters (the normalization constant values), which specify the width of the weight $w_{ij}$ to be assigned according to the respective Euclidean distances between the grid point datasets ($y_{1j}$, $y_{2j}$, $y_{3j}$) and the actual datasets ($y_{1i}$, $y_{2i}$, $y_{3i}$), according to the evaluation value characteristic based on the evaluation values S. Thus, the weight $w_{ij}$ to be assigned to the actual datasets is adjusted when the inverse color conversion characteristic model is generated, and thereby the color conversion accuracy of the inverse color conversion characteristic model is improved.

A region having a small evaluation value S is one where the actual datasets ($y_{1i}$, $y_{2i}$, $y_{3i}$) that are the colorimetry values in the L*a*b* color space are unevenly distributed in the L*a*b* color space, as shown in FIG. 6. For this reason, as described with FIG. 7, in the region having the small evaluation value S, the color conversion characteristic model generated with the weight $w_{ij}$ assigned to the actual datasets ($y_{1i}$, $y_{2i}$, $y_{3i}$) has a low gradient (rate of change), and accordingly the correlation between the actual dataset ($y_{1i}$, $y_{2i}$, $y_{3i}$) in the L*a*b* color space and the actual dataset ($x_{1i}$, $x_{2i}$, $x_{3i}$, $x_{4i}$) in the CMYK color space turns out to be small. Therefore, the color conversion characteristic model generated in the region having the small evaluation values S is more likely to cause a conversion error.

To avoid such a conversion error, the color conversion characteristic model generator 20 sets a wider width of the weight $w_{ij}$, which is to be assigned to the actual datasets, when generating the color conversion characteristic model for a region having a small evaluation value S. Thereby, a region including the actual datasets ($y_{1i}$, $y_{2i}$, $y_{3i}$) in the L*a*b* color space used to generate the color conversion characteristic model is widened in a region having a small evaluation value S and a small correlation between these two types of actual datasets. As a result, the unevenness in the dispersion of the actual datasets ($y_{1i}$, $y_{2i}$, $y_{3i}$) in such a region is reduced, and accordingly the color conversion accuracy of the generated color conversion characteristic model is also improved even for a region having the small evaluation value S.

Figure 16:
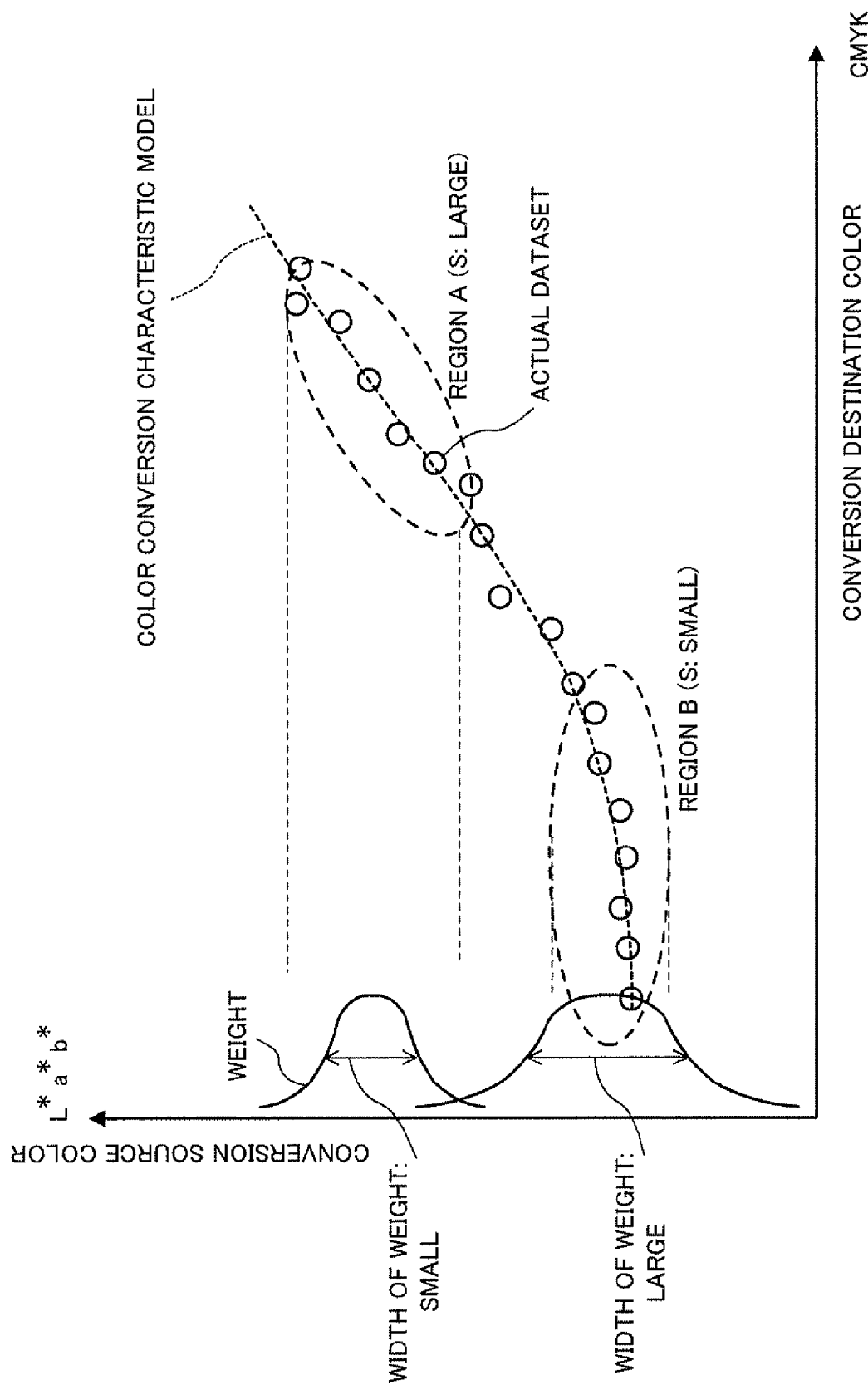
FIG. 16 is a graph for explaining the width of the weight set according to the evaluation values and assigned to the actual datasets in the L*a*b* color space.

FIG. 16 is a graph for explaining the width of the weight set according to the evaluation values S and assigned to the actual datasets ($y_{1i}$, $y_{2i}$, $y_{3i}$) in the L*a*b* color space. A region A having a large evaluation value S shows a high dispersion of the actual datasets ($y_{1i}$, $y_{2i}$, $y_{3i}$) in the L*a*b* color space as shown in FIG. 16. Thus, the color conversion accuracy of the generated color conversion characteristic model is secured even if the width of the weight is set relatively small.

On the other hand, a region B having a small evaluation value S has a low dispersion of the actual datasets ($y_{1i}$, $y_{2i}$, $y_{3i}$) in the L*a*b* color space. Thus, the color conversion accuracy of the generated color conversion characteristic model is decreased if the width of the weight is set as small as that of the region A having the large evaluation value S. For this reason, the width of the weight for the region B having the small evaluation value S is set larger than that for the region A having the large evaluation value S. This setting widens the region in the L*a*b* color space for the actual datasets ($y_{1i}$, $y_{2i}$, $y_{3i}$) used to generate the color conversion characteristic model, thereby enhancing the dispersion property of this region as a whole. As a result, the color conversion accuracy of the generated color conversion characteristic model is improved.

Figure 17:
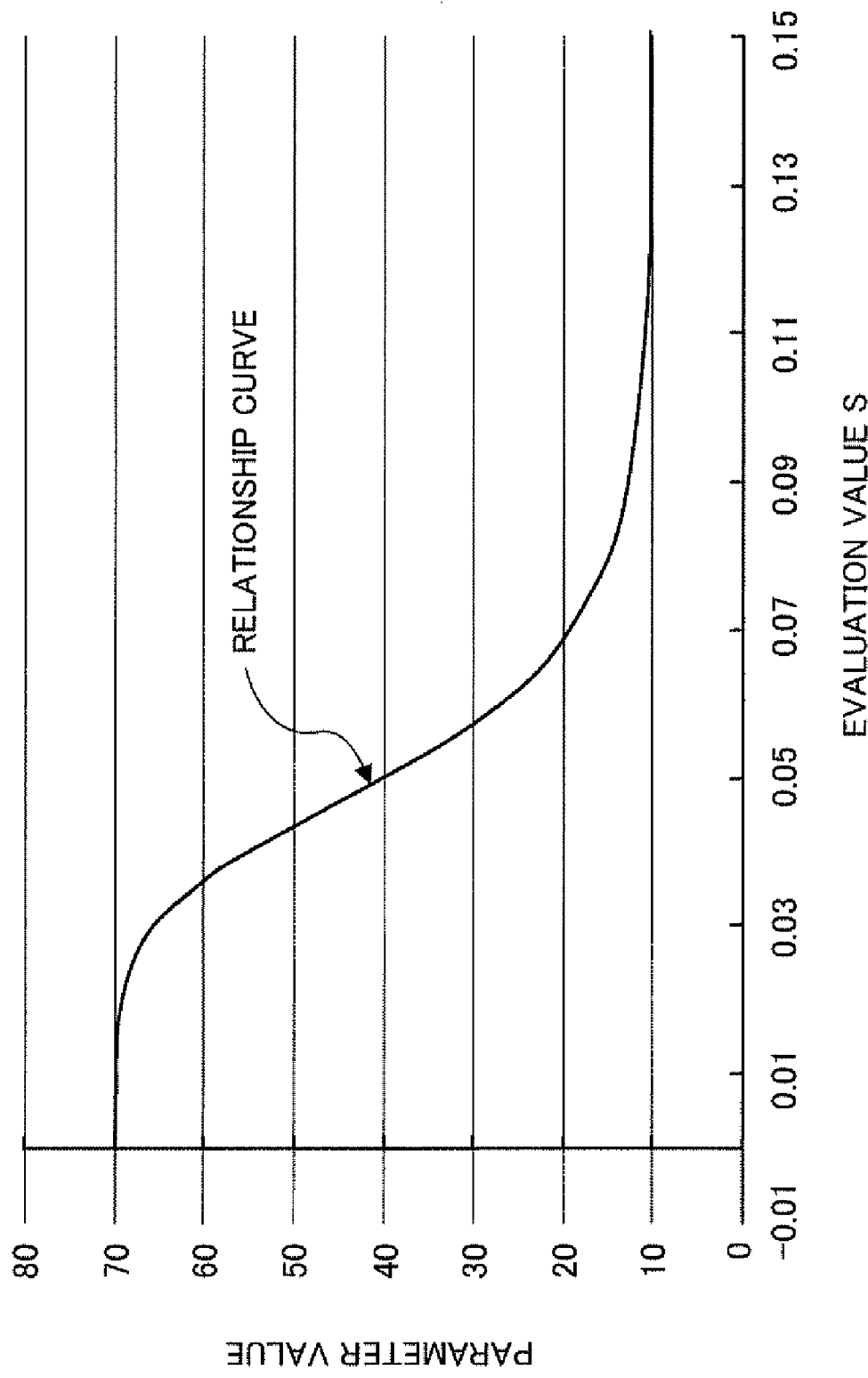
FIG. 17 shows one example of a relationship curve used in the color conversion characteristic model generator to set a correspondence between the evaluation value and the parameter value that specifies the width of the weight.

The following diagram, FIG. 17 shows one example of a relationship curve used in the color conversion characteristic model generator 20 to set a correspondence between the evaluation value S and the parameter value that specifies the width of the weight. The weight generator 23 in the color conversion characteristic model generator 20 sets the setting values of the parameters (parameter values) for specifying the width of the weight, according to the evaluation value S by using the evaluation value characteristic (FIGS. 10 and 11) based on the evaluation values S acquired from the actual data evaluator 50, and the relationship curve shown in, for example, FIG. 17.

In this case, a function having the following characteristic is used as the relationship curve. Specifically, this function specifies a relationship in which the parameter values (the width of the weight) monotonously decrease according to an increase of the evaluation value S so that the width of the weight may be set larger as the evaluation value S becomes smaller. At this time, the parameter values (the width of the weight) associated with the evaluation value S according to the relationship curve in FIG. 17 are statistically calculated so that the color conversion accuracy of the color conversion characteristic model generated with use of the set parameter values (the width of the weight) may satisfy a value set in advance. Then, the calculated parameter values (the width of the weight) are set. This setting allows the generation of a stable color conversion characteristic model addressing uncertain factors that may occur during the calculation of the evaluation values and the color conversion characteristic models.

Next, the description will be provided for the processing of setting the parameter values (normalization constant values) performed in the color conversion characteristic model generator 20.

Figure 18:
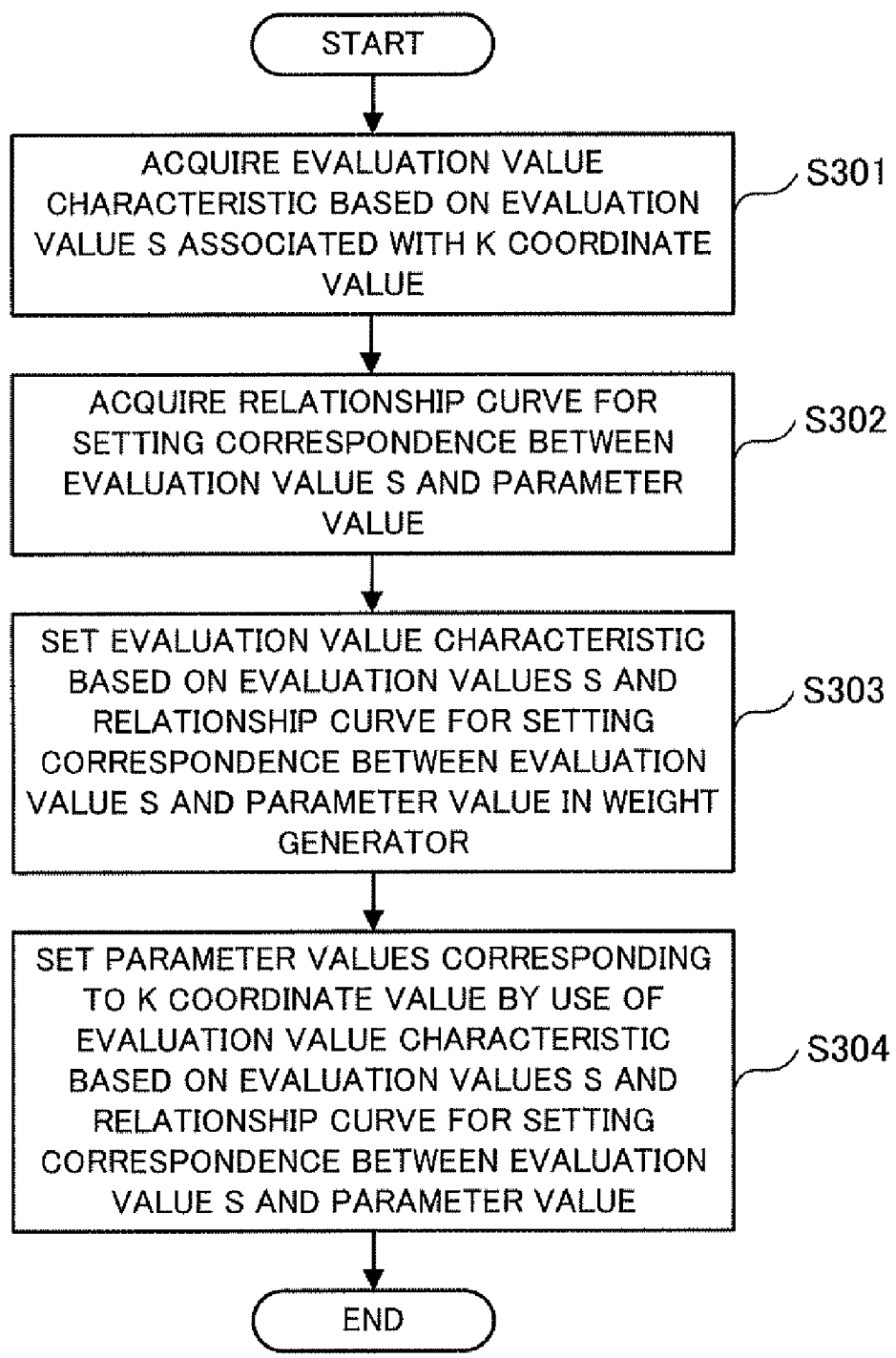
FIG. 18 is a flowchart showing one example of a processing procedure in which the color conversion characteristic model generator sets the parameter values.

FIG. 18 is a flowchart showing one example of a processing procedure in which the color conversion characteristic model generator 20 sets the parameter values. As shown in FIG. 18, from the actual data evaluator 50, the color conversion characteristic model generator 20 acquires the evaluation value characteristic (see FIGS. 10 and 11) based on the evaluation value S associated with the K coordinate value (coverage value K (%)) (step 301).

Moreover, in a memory (not shown in the figure) of the color processor 1, a relationship curve shown in FIG. 17, for example, for setting the correspondence between the evaluation value S and the parameter value that specifies the width of the weight is stored. The color conversion characteristic model generator 20, then, acquires this relationship curve shown in FIG. 17 from the memory (step 302).

After that, the color conversion characteristic model generator 20 sets, in the weight generator 23, the acquired evaluation value characteristic based on the evaluation values S and the acquired relationship curve (step 303). With this setting, the weight generator 23 in the color conversion characteristic model generator 20 calculates and sets the parameter values (normalization constant values) corresponding to the K coordinate value (coverage value K (%)) (step 304). Here, the parameter values are calculated by use of both of the evaluation value characteristic based on the evaluation values S associated with the coverage value K (%), and the relationship curve for setting the correspondence between the evaluation value S and the parameter value.

Figure 19:
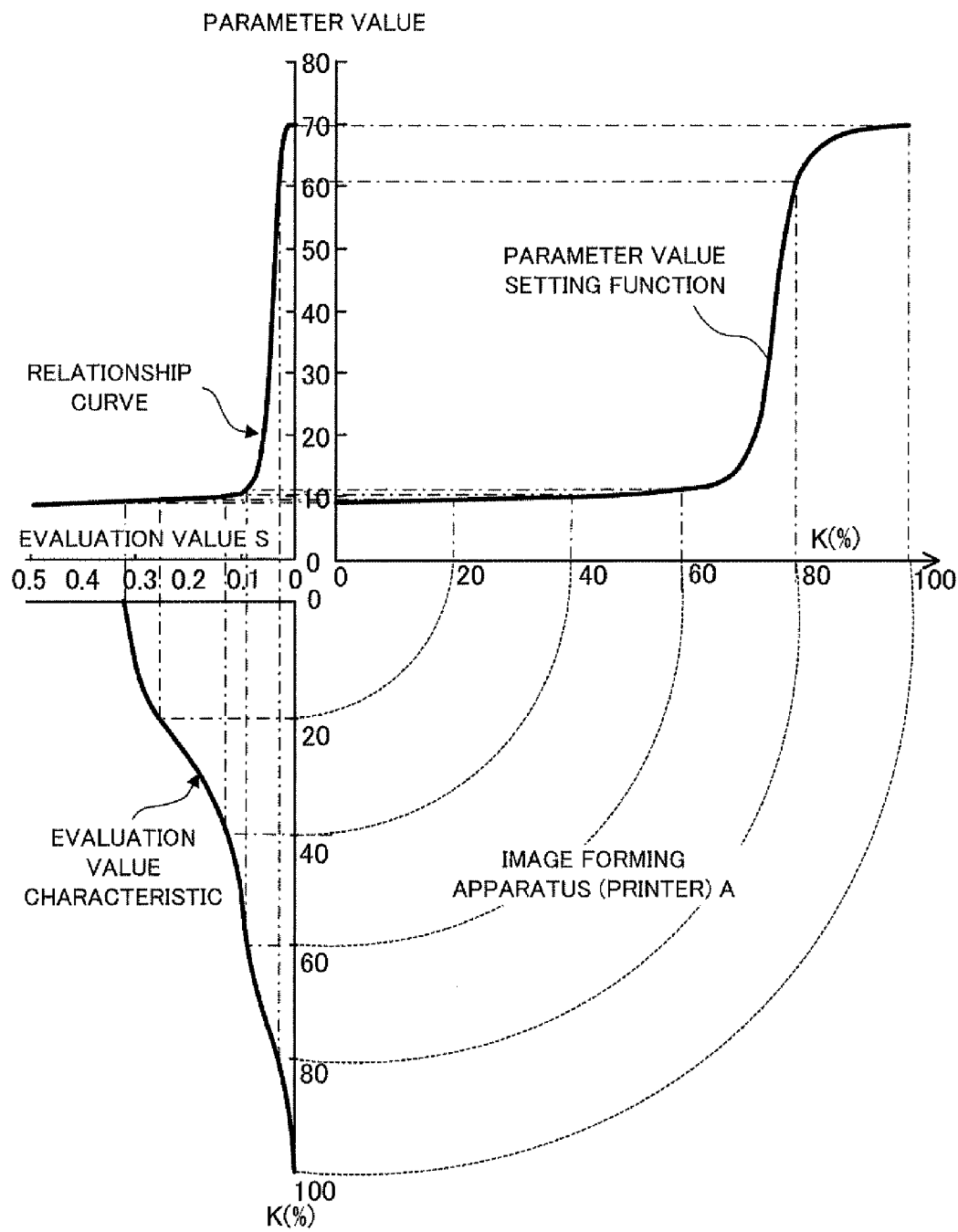
FIG. 19 is a graph for explaining the processing in which the weight generator calculates the parameter values corresponding to the K coordinate value.

FIG. 19 is a graph for explaining the processing in which the weight generator 23 calculates the parameter values (normalization constant values) corresponding to the K coordinate value (coverage value K (%)) in step 304. FIG. 19 shows the case where the parameter values are calculated corresponding to the coverage value K (%) to be set in the aforementioned image forming apparatus (printer) A shown in FIG. 10, according to the evaluation value characteristic based on the evaluation values S in the image forming apparatus (printer) A shown in FIG. 10 and the relationship curve shown in FIG. 17.

As shown in FIG. 19, the weight generator 23 reads out the evaluation value S corresponding to each coverage value K (%) from the evaluation value characteristic (FIG. 10) shown in a third quadrant in FIG. 19. Then, the weight generator 23 calculates the parameter value corresponding to the read-out evaluation value S by use of the relationship curve (FIG. 17) shown in a second quadrant in FIG. 19. In this way, the parameter value corresponding to each coverage value K (%) is figured out.

In addition, based on the thus obtained parameter value corresponding to each coverage value K (%), the weight generator 23 figures out a parameter value setting function that sets a parameter value P over the entire range of the coverage value K (W) shown in a first quadrant in FIG. 19.

This parameter value setting function for the entire range of the coverage value K (%) is calculated by use of the following equation (17).

$$P = \alpha - \frac{\alpha - 1}{\left(\frac{K}{K_{inf}}\right)^{\beta} + 1} \qquad (17)$$

In the equation (17), three coefficients $\alpha$, $\beta$ and $K_{inf}$ for adjusting the shape of the parameter value setting function are set. The coefficient $\alpha$ is for adjusting the maximum value of the parameter value setting function, the coefficient $\beta$ is for adjusting the gradient of the parameter value setting function, and the coefficient $K_{inf}$ is for adjusting an inflection point of the parameter value setting function. The weight generator 23 calculates these three coefficients $\alpha$, $\beta$ and $K_{inf}$ by use of the obtained parameter value corresponding to each of the figured-out coverage value K (%), and thereby sets the parameter value setting function.

Consequently, in the image forming apparatus (printer) A, the parameter values corresponding to the coverage value K (%), i.e., the normalization constants $y_{10}$, $y_{20}$, $y_{30}$, $x_{40}$ for specifying the width of the weight $w_{ij}$ to be assigned to the actual datasets ($y_{1i}$, $y_{2i}$, $y_{3i}$, $x_{40}$), are set according to the parameter value setting function of the image forming apparatus (printer) A shown in FIG. 19.

Figure 20:
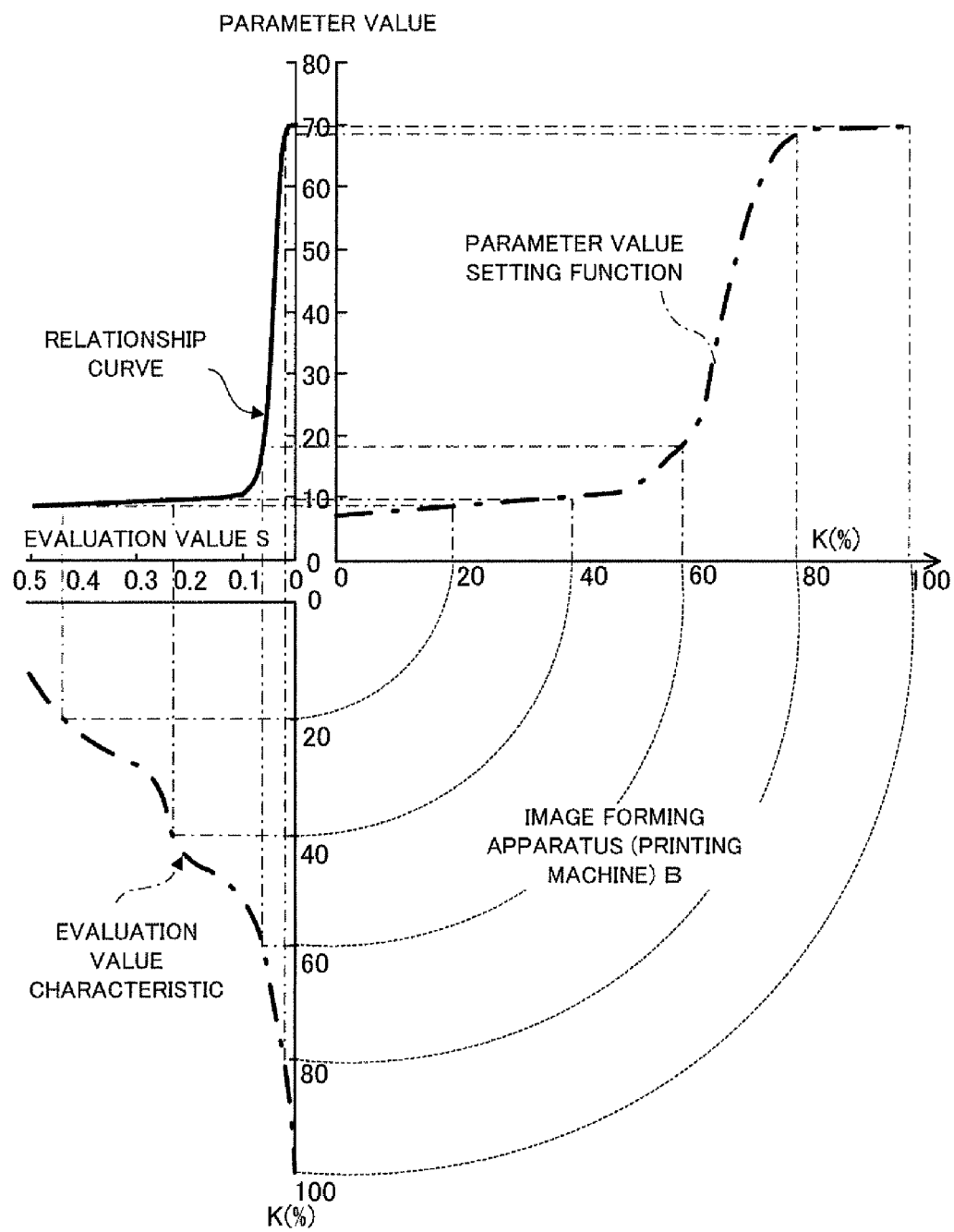
FIG. 20 is a graph for explaining the processing in which the weight generator calculates the parameter values corresponding to the K coordinate value.

Similarly, FIG. 20 is a graph for explaining the processing in which the weight generator 23 calculates the parameter values (normalization constants) corresponding to the K coordinate value (coverage value K (%)) in step 204. FIG. 20 shows the case where the parameter values are calculated corresponding to the coverage value K (%) to be set in the aforementioned image forming apparatus (printing machine) B shown in FIG. 11, according to the evaluation value characteristic based on the evaluation values S in the image forming apparatus (printing machine) B shown in FIG. 11 and the relationship curve shown in FIG. 17.

In this case, the parameter value setting function is also set for the image forming apparatus (printing machine) B in the same manner as in the case of FIG. 19. Thus, in the image forming apparatus (printing machine) B, the parameter values corresponding to the coverage value K (%), i.e., the normalization constants $y_{10}$, $y_{20}$, $y_{30}$, $x_{40}$ for specifying the width of the weight $w_{ij}$ to be assigned to the actual datasets ($y_{1i}$, $y_{2i}$, $y_{3i}$, $x_{40}$), are set according to the parameter value setting function of the image forming apparatus (printing machine) B shown in FIG. 20.

Figure 21:
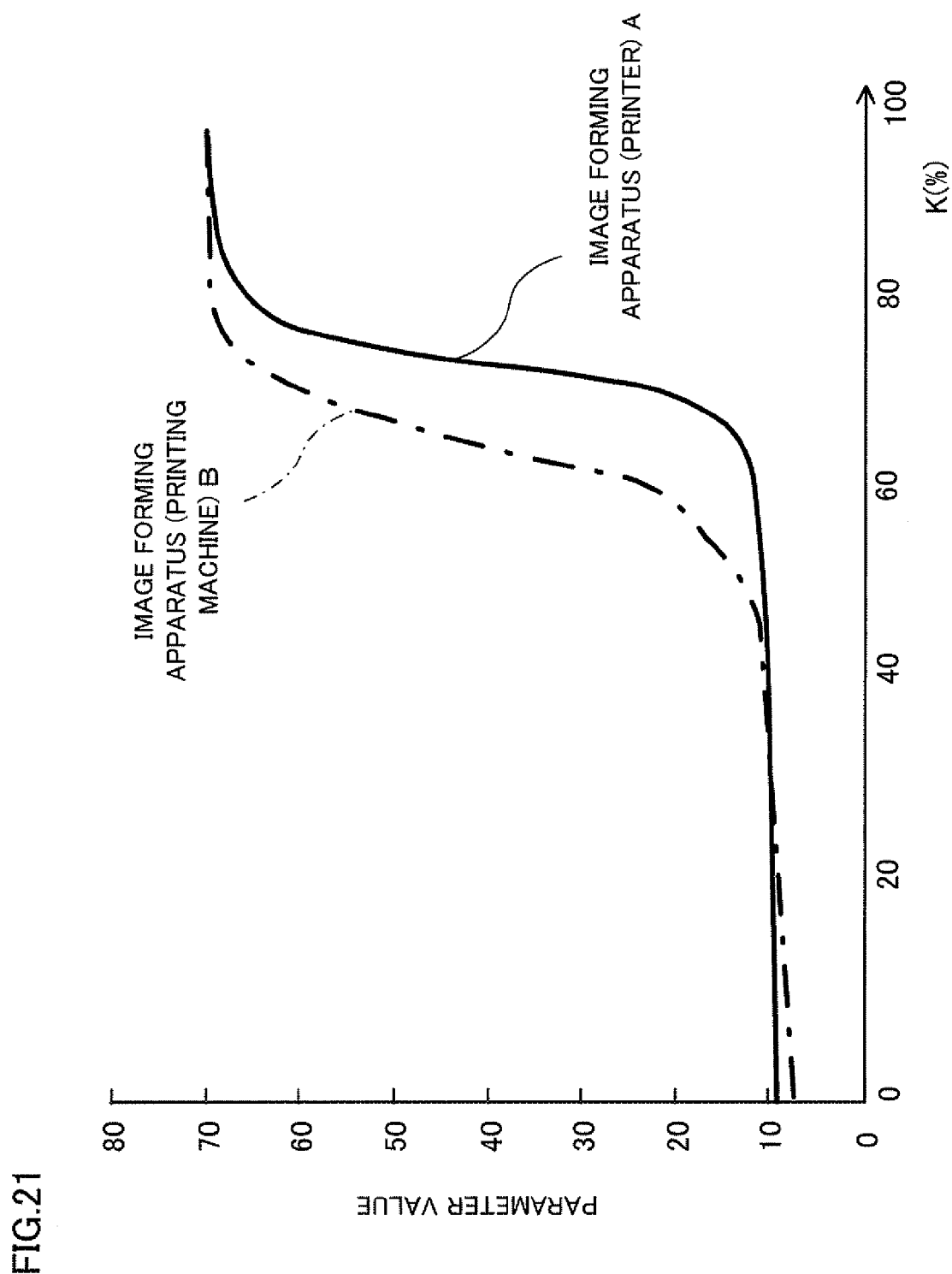
FIG. 21 is a graph in which the parameter value setting function of the image forming apparatus is compared with the parameter value setting function of the another image forming apparatus.

FIG. 21 is a graph in which the parameter value setting function of the image forming apparatus (printer) A is compared with the parameter value setting function of the another image forming apparatus (printing machine) B. As shown in FIG. 21, because the actual data pairs used in the image forming apparatus (printer) A are different from those used in the image forming apparatus (printing machine) B, the different parameter value setting functions are set in the image forming apparatus (printer) A and the image forming apparatus (printing machine) B.

Figure 22:
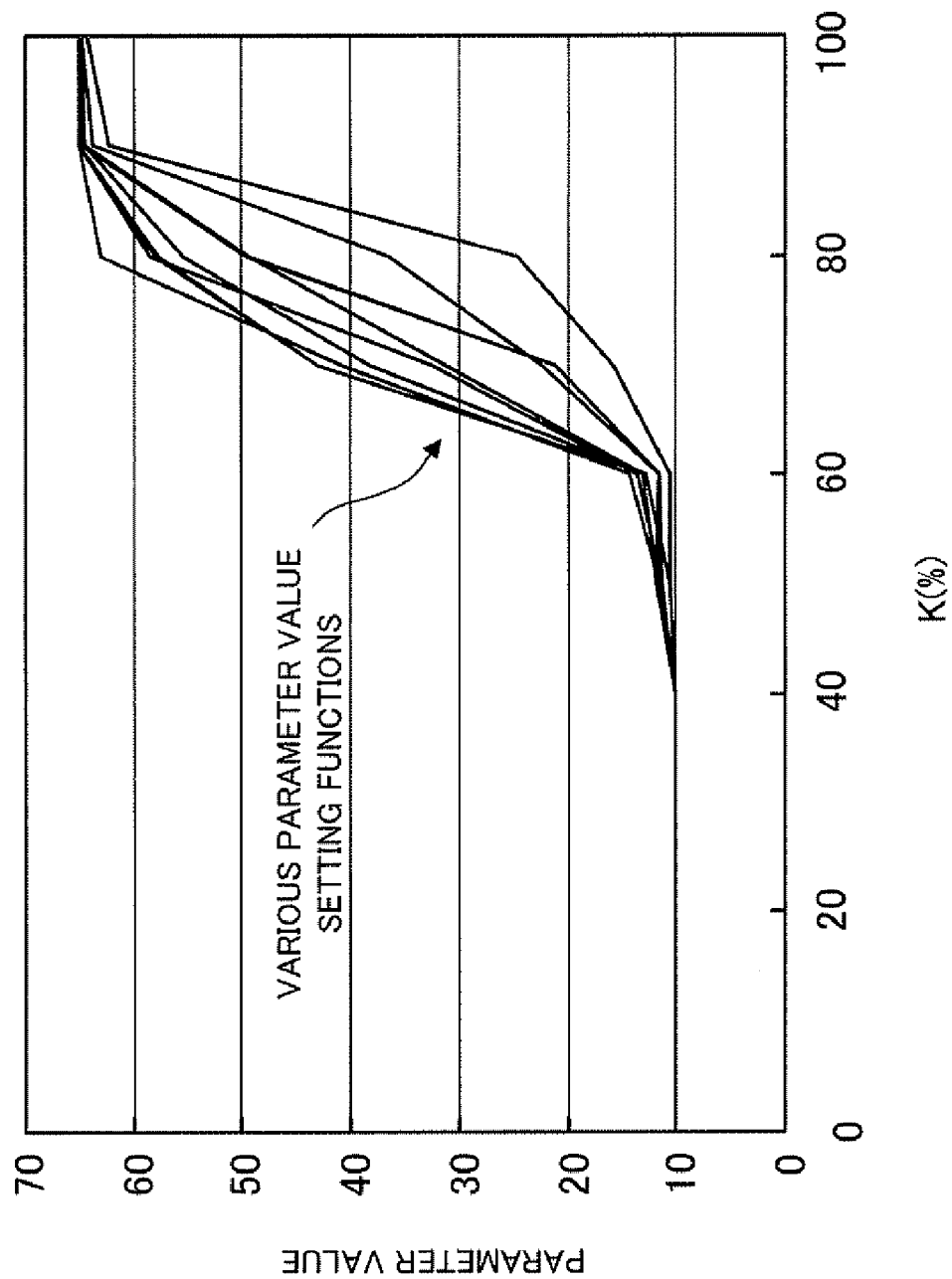
FIG. 22 is a graph showing parameter value setting functions calculated in various kinds of image forming apparatuses.

FIG. 22 is a graph showing parameter value setting functions calculated in various kinds of image forming apparatuses. As shown in FIG. 22, the image forming apparatuses are set to have the respective parameter value setting functions that differ depending on the actual data pairs used therein. Hence, in each of the image forming apparatuses, the normalization constants $y_{10}$, $y_{20}$, $y_{30}$, $x_{40}$ corresponding to the coverage value K (%) are set according to the parameter value setting function thus set. This improves the color conversion accuracy of the generated inverse color conversion characteristic model even for a region having a small evaluation value S.

As described above, the color processor 1 of the present exemplary embodiment evaluates actual data pairs used to generate the color conversion characteristic model from the viewpoint of the influence on the color conversion accuracy of the color conversion characteristic model generated based on these actual data pairs, and calculates the evaluation values S of the actual data pairs for every region in the color space. Moreover, the color processor 1 sets the parameter value setting function that sets the parameter value P according to the evaluation values S thus calculated for every region (coverage value K (%)) in the color space. According to the parameter value setting function thus set, the weight assignment to the actual data pairs used to generate the inverse color conversion characteristic model is set by use of the parameter values (normalization constant values) specifying the width of the weight. In this way, the weight assignment to the actual data pairs used to generate the inverse color conversion characteristic model is adjusted. This adjustment improves the color conversion accuracy of the inverse color conversion characteristic model even for the region having the small evaluation value S, and thereby enhances the color conversion accuracy of both of the normal and inverse color conversion characteristic models for the entire range of the color gamut.

Figure 23A:
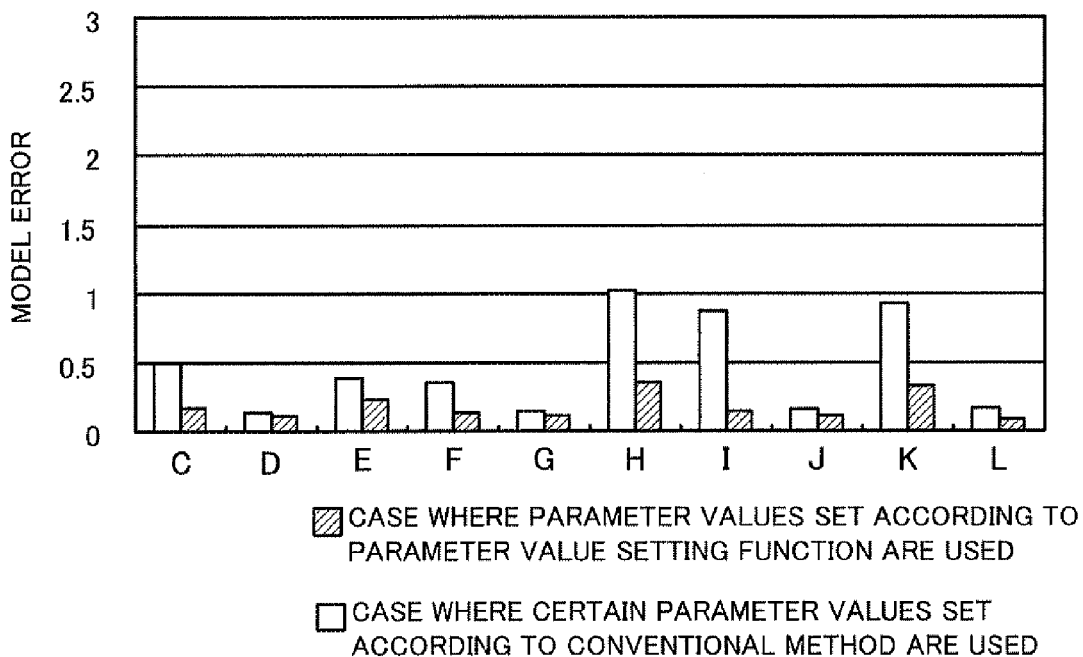
FIG. 23A shows a comparison between various types of image forming apparatuses in terms of the root mean squares (RMS) of the model errors.
Figure 23B:
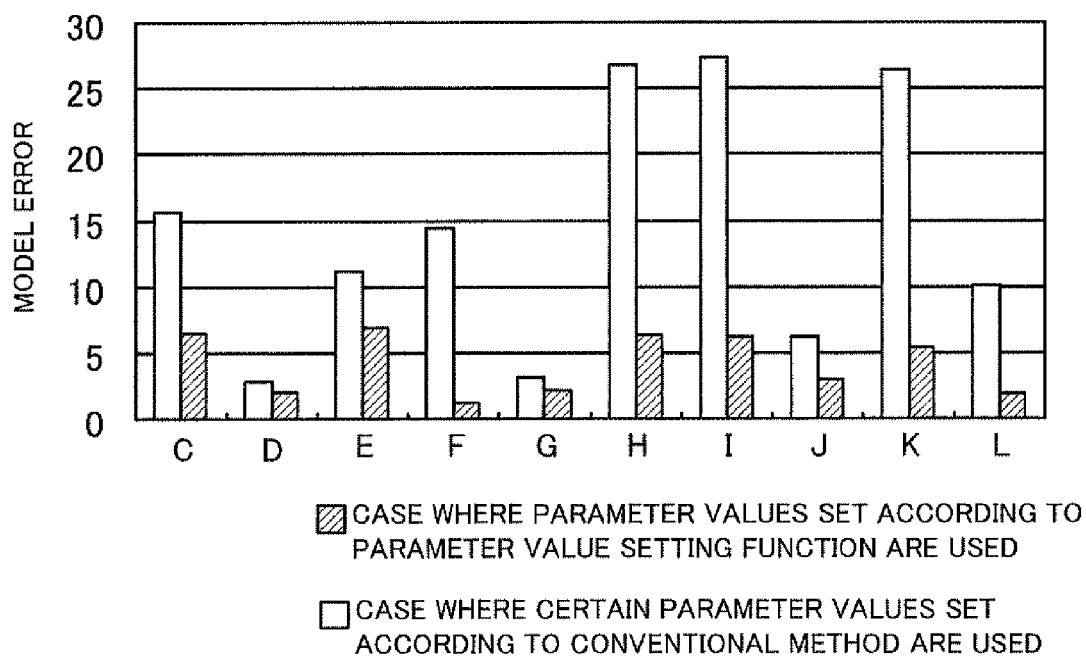
FIG. 23B shows a comparison between the various types of image forming apparatuses in terms of the maximum values of model errors (maximum error)

FIGS. 23A and 23B are graphs each showing a comparison of model errors (see FIG. 4) between the case where the inverse color conversion characteristic model is generated by use of the parameter values (normalization constants) set according to the parameter value setting function and the case where certain parameter values set according to the conventional method are used. FIG. 23A shows a comparison between various types of image forming apparatuses C to L in terms of the root mean squares (RMS) of the model errors, whereas FIG. 23B shows a comparison between the various types of image forming apparatuses C to L in terms of the maximum values of model errors (maximum error). In FIGS. 23A and 23B, 9×9×9×9=6561 grid point datasets in the CMYK color space are used to calculate the model errors. As shown in FIGS. 23A and 23B, the setting of the parameter values (normalization constants) according to the parameter value setting functions leads to an improvement in the model errors.

Figure 24:
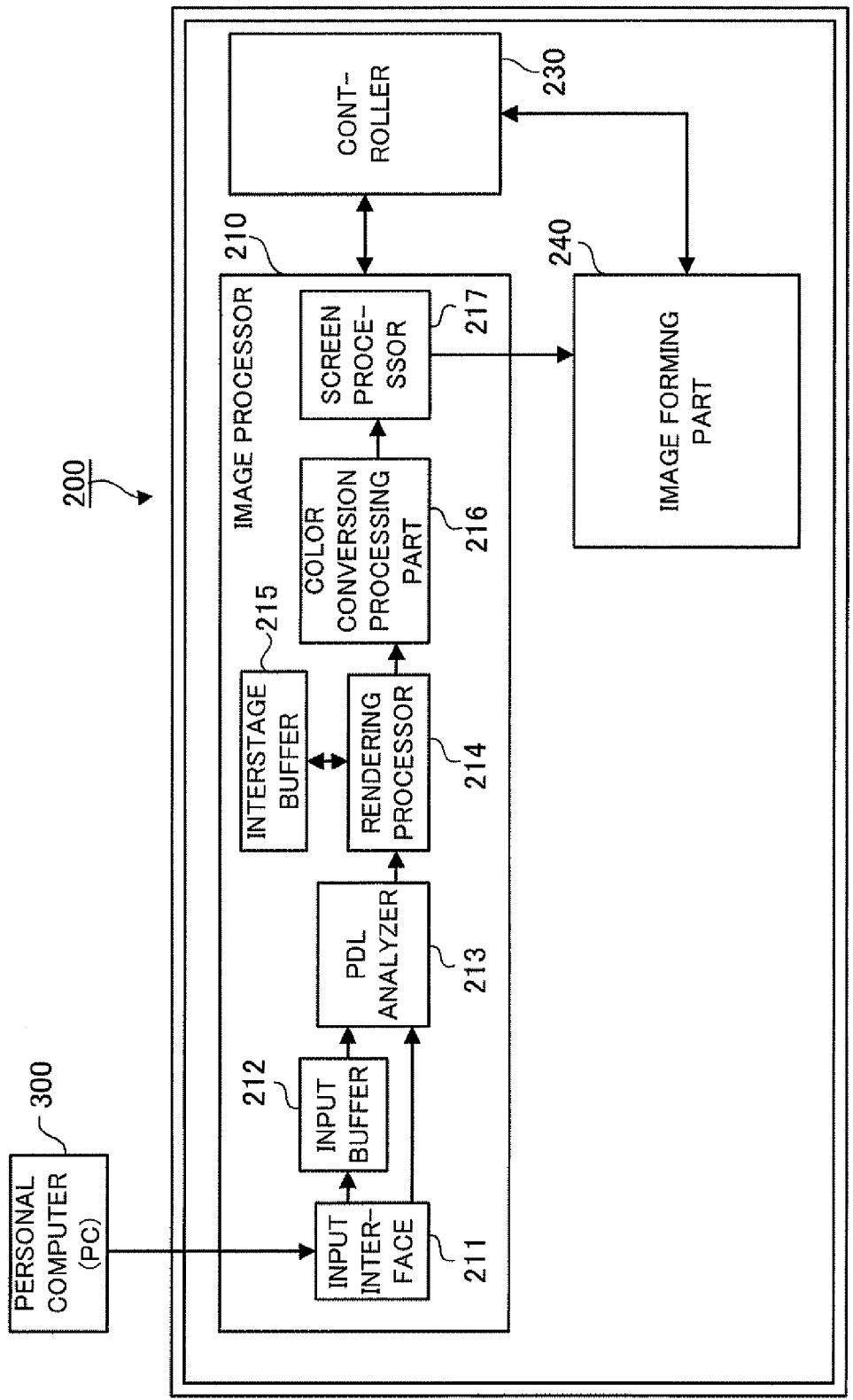
FIG. 24 is a block diagram showing a configuration of an image forming apparatus in which a direct lookup table (DLUT) generated by the color processor in the present exemplary embodiment is mounted.

Subsequently, FIG. 24 is a block diagram showing a configuration of an image forming apparatus 200 in which a direct look-up table (DLUT) generated by the color processor 1 in the present exemplary embodiment is mounted.

The image forming apparatus 200 shown in FIG. 24 is a digital color printer, for example, and includes: an image processor 210 that performs an image processing on image data inputted from an external device; a controller 230 that controls the entire operations of the image forming apparatus 200; and an image forming part 240 that is implemented, for instance, by an electrographic printer engine for forming an image on a recording medium according to image data composed of color components.

The image processor 210 includes: an input interface 211 that receives an input of image data from an external device such as a personal computer (PC) 300, for example; an input buffer 212 that temporarily stores the image data received by the input interface 211; a page description language (PDL) analyzer 213 that generates intermediate data by analyzing the image data in the PDL format; a rendering processor 214 that expands (renders) the intermediate data generated by the PDL analyzer 213 into image data for printing (raster image data) expressed by an array of image elements; an interstage buffer 215 that is used as a work area for the rendering processing by the rendering processor 214; a color conversion processing part 216 that is a color processor for performing color conversion processing on the rendered image data; and a screen processor 217 that performs a screen processing on the color-converted image data.

In addition, the color conversion processing part 216 in the image processor 210 is equipped with the DLUT generated by the color processor 1 in the present exemplary embodiment, and uses the DLUT to perform the color conversion processing on the image data rendered by the rendering processor 214. Thereafter, the screen processor 217 performs the screen processing set in advance on the image data having been color-converted by the color conversion processing part 216, and then the image forming part 240 forms an image on a paper sheet according to the resultant image data.

Figure 25:
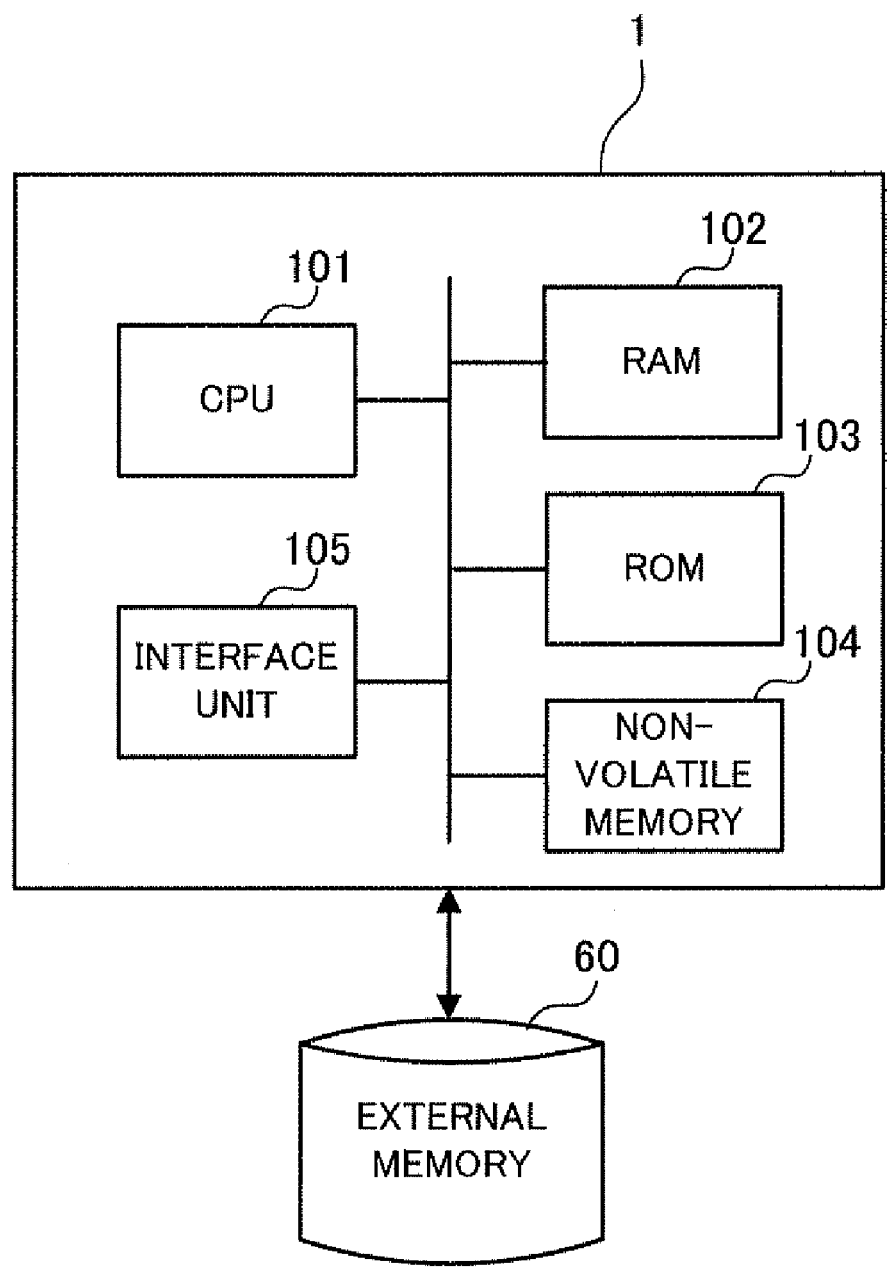
FIG. 25 is a diagram showing a hardware configuration of the color processor according to the present exemplary embodiment.

FIG. 25 is a diagram showing a hardware configuration of the color processor 1 according to the present exemplary embodiment. As shown in FIG. 25, in order to execute the color conversion processing, the color processor 1 includes a CPU 101 as one example of a computing unit executing a digital computing processing in accordance with a processing program set in advance, a RAM 102 in which a processing program and the like executed by the CPU 101 are stored, a ROM 103 in which data such as a setting value used for the processing program and the like executed by the CPU 101 are stored, a non-volatile memory 104 such as an EEPROM, a flash memory or the like in which data are rewritable and data are kept even in a case of no power supply, and an interface unit 105 that control signal input from and signal output to the respective units connected to the color processor 1.

Further, to the color processor 1, an external memory 60 is connected. In the external memory 60, a processing program executed by the color processor 1 is stored. When the color processor 1 reads out the processing program, the color conversion processing is executed in the color processor 1 according to the present exemplary embodiment.

More specifically, a program that realizes respective functions of the above-mentioned grid point data acquiring part 10, color conversion characteristic model generator 20, color conversion processor 30, color conversion data output part 40 and actual data evaluator 50 is loaded into the RAM 102 in the color processor 1 from the external memory 60. Then, the CPU 101 performs various kinds of processings on the basis of the processing program loaded into the RAM 102. The processing program is provided by loading, into the RAM 102, the processing program stored in, for example, a hard disk, a DVD-ROM or the like as the external memory 60. Alternatively, another aspect of providing the processing program, the processing program may be stored in the ROM 103 in advance, and loaded into the RAM 102 from the ROM 103. Otherwise, when the color processor 1 is provided with a rewritable ROM 103 such as an EEPROM, the processing program may be provided to the ROM 103 after the assembling of the color processor 1 is completed, and then the processing program may be loaded into the RAM 102 from the ROM 103. Further, the processing program may be transmitted to the color processor 1 through a network such as the Internet, and then installed in the RAM 102 in the color processor 1.

As described above, the color processor 1 in the present exemplary embodiment evaluates actual data pairs used to generate the color conversion characteristic models, from the viewpoint of the influence on the color conversion accuracy of the color conversion characteristic model generated based on these actual data pairs, and then calculates the evaluation values S of the actual data pairs for every region in the color space. Moreover, the color processor 1 sets the parameter value setting function for setting the parameter value P corresponding to the calculated evaluation value S for every region in the color space. Thereafter, according to the set parameter value setting function, the color processor 1 sets the weight assignment to the actual data pairs used to generate the inverse color conversion characteristic model, by use of the parameter values (normalization constant values) specifying the width of the weight. Thereby the color processor 1 adjusts the weight assignment to the actual data pairs that are to be used to generate the inverse color conversion characteristic model. This adjustment leads to an improvement in the color conversion accuracy of the inverse color conversion characteristic model for a region having a small evaluation value S, thereby enhancing the color conversion accuracy of both the normal and inverse color conversion characteristic models for the entire range of the color gamut.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A color processor comprising:
   a conversion source color data acquiring part that acquires a conversion source color dataset in a first color space;
   a color data pair acquiring part that acquires color data pairs each composed of a color dataset in the first color space and a color dataset in a second color space that is a conversion destination color space, the color dataset in the first color space and the color dataset in the second color space being both used to calculate a color conversion characteristic model specifying a correspondence between a color in the first color space and a color in the second color space;
   a color conversion characteristic model calculator that assigns weight to the color dataset in the first color space included in corresponding one of the color data pairs acquired by the color data pair acquiring part, according to a color difference distance between the color dataset in the first color space and the conversion source color dataset acquired by the conversion source color data acquiring part, and calculates the color conversion characteristic model by use of color data pairs each including a weighted color dataset in the first color space; and
   an evaluation value calculator that calculates an evaluation value indicating an evaluation on influence of the color data pairs on color conversion accuracy of the color conversion characteristic model by
      (a) calculating the evaluation value for a surrounding region around a plurality of reference color coordinate points arranged at intervals in the first color space by estimating the error occurring on the color conversion characteristic model according to the following formula, $$S = \sigma^2_{second\ color\ space} / \sigma^2_{first\ color\ space}$$

where S is the evaluation value, $\sigma^2_{second\ color\ space}$ is a degree of dispersion of the color dataset in the second color space from a mean value coordinate point in the surrounding region for the second color space and $\sigma^2_{first\ color\ space}$ is a degree of dispersion of the color dataset in the first color space from a mean value coordinate point in the surrounding region for the first color space, (b) associating the evaluation value with a coordinate component included in each of the reference color coordinate points, and
      (c) transmitting the evaluation value associated with the coordinate component to the color conversion characteristic model calculator,
   the color conversion characteristic model calculator adjusting the weight to be assigned to the color dataset in the first color space according to the evaluation value, which is associated with the coordinate component, calculated by the evaluation value calculator, when calculating the color conversion characteristic model.

2. The color processor according to claim 1, wherein the evaluation value calculator calculates a dispersion of the color datasets in the first color space included in the color data pairs and located in an surrounding region around each of reference color coordinate points arranged at intervals in the first color space, and a dispersion of the color datasets in the second color space that are paired with the respective color datasets in the first color space located in the surrounding region, and calculates the evaluation value on the basis of a relative ratio between the dispersion of the color datasets in the first color space and the dispersion of the color datasets in the second color space.

3. The color processor according to claim 1, wherein the color conversion characteristic model calculator adjusts the weight to be assigned to the color dataset in the first color space by changing, according to the evaluation value, a correspondence between the weight and the color difference distance between the color dataset in the first color space and the conversion source color dataset.

4. The color processor according to claim 1, wherein the evaluation value calculator specifies, as the evaluation value associated with the coordinate component, any one of a maximum value, a minimum value and a mean value of a plurality of the evaluation values for the coordinate component, the evaluation values being each calculated for the surrounding region around each of the reference color coordinate points.

5. The color processor according to claim 1, wherein the color conversion characteristic model calculator adjusts the weight by setting the weight that is statistically associated with the evaluation value calculated by the evaluation value calculator so that the color conversion accuracy of the color conversion characteristic model satisfies a value set in advance.

6. A color processing method comprising:
   acquiring a conversion source color dataset in a first color space;
   acquiring color data pairs each composed of a color dataset in the first color space and a color dataset in a second color space that is a conversion destination color space, the color dataset in the first color space and the color dataset in the second color space being both used to calculate a color conversion characteristic model specifying a correspondence between a color in the first color space and a color in the second color space;
   assigning weight to the color dataset in the first color space included in corresponding one of the color data pairs, according to a color difference distance between the color dataset in the first color space and the conversion source color dataset, and calculating the color conversion characteristic model by use of color data pairs each including weighted color dataset in the first color space;

calculating an evaluation value indicating an evaluation on influence of the color data pairs on color conversion accuracy of the color conversion characteristic model by (a) calculating the evaluation value for a surrounding region around a plurality of reference color coordinate points arranged at intervals in the first color space by estimating the error occurring on the color conversion characteristic model according to the following formula, $$S = \sigma^2_{second\ color\ space} / \sigma^2_{first\ color\ space}$$

where S is the evaluation value, $\sigma^2_{second\ color\ space}$ is a degree of dispersion of the color dataset in the second color space from a mean value coordinate point in the surrounding region for the second color space and $\sigma^2_{first\ color\ space}$ is a degree of dispersion of the color dataset in the first color space from a mean value coordinate point in the surrounding region for the first color space, (b) associating the evaluation value with a coordinate component included in each of the reference color coordinate points, and (c) transmitting the evaluation value associated with the coordinate component to the color conversion characteristic model calculator; and adjusting the weight to be assigned to the color dataset in the first color space according to the evaluation value, which is associated with the coordinate component, when calculating the color conversion characteristic model.

7. The color processing method according to claim 6, wherein calculating the evaluation value includes calculating a dispersion of the color datasets in the first color space included in the color data pairs and located in an surrounding region around each of reference color coordinate points arranged at intervals in the first color space, and a dispersion of the color datasets in the second color space that are paired with the respective color datasets in the first color space located in the surrounding region, and calculating the evaluation value on the basis of a relative ratio of the dispersion of the color datasets in the first color space and the dispersion of the color datasets in the second color space.

8. A non-transitory computer readable medium storing a program causing a computer to execute a process for color conversion, the process comprising:

acquiring a conversion source color dataset in a first color space;

acquiring color data pairs each composed of a color dataset in the first color space and a color dataset in a second color space that is a conversion destination color space, the color dataset in the first color space and the color dataset in the second color space being both used to calculate a color conversion characteristic model specifying a correspondence between a color in the first color space and a color in the second color space;

assigning weight to the color dataset in the first color space included in corresponding one of the color data pairs, according to a color difference distance between the color dataset in the first color space and the conversion source color dataset, and calculating the color conversion characteristic model by use of color data pairs each including weighted color dataset in the first color space;

calculating an evaluation value indicating an evaluation on influence of the color data pairs on color conversion accuracy of the color conversion characteristic model by (a) calculating the evaluation value for a surrounding region around a plurality of reference color coordinate points arranged at intervals in the first color space by estimating the error occurring on the color conversion characteristic model according to the following formula, $$S = \sigma^2_{second\ color\ space} / \sigma^2_{first\ color\ space}$$

where S is the evaluation value, $\sigma^2_{second\ color\ space}$ is a degree of dispersion of the color dataset in the second color space from a mean value coordinate point in the surrounding region for the second color space, and $\sigma^2_{first\ color\ space}$ is a degree of dispersion of the color dataset in the first color space from a mean value coordinate point in the surrounding region for the first color space, (b) associating the evaluation value with a coordinate component included in each of the reference color coordinate points, and (c) transmitting the evaluation value associated with the coordinate component to the color conversion characteristic model calculator; and adjusting the weight to be assigned to the color dataset in the first color space according to the evaluation value, which is associated with the coordinate component, when calculating the color conversion characteristic model.

9. The non-transitory computer readable medium according to claim 8, wherein calculating the evaluation value includes calculating a dispersion of the color datasets in the first color space included in the color data pairs and located in an surrounding region around each of reference color coordinate points arranged at intervals in the first color space, and a dispersion of the color datasets in the second color space that are paired with the respective color datasets in the first color space located in the surrounding region, and calculating the evaluation value on the basis of a relative ratio of the dispersion of the color datasets in the first color space and the dispersion of the color datasets in the second color space.

10. The non-transitory computer readable medium according to claim 8, wherein adjusting the weight includes adjusting the weight to be assigned to the color dataset in the first color space by changing, according to the evaluation value, a correspondence between the weight and the color difference distance between the color dataset in the first color space and the conversion source color dataset.

11. The non-transitory computer readable medium according to claim 8, wherein calculating the evaluation value includes specifying, as the evaluation value associated with the coordinate component, any one of a maximum value, a minimum value and a mean value of a plurality of the evaluation values for the coordinate component, the evaluation values being each calculated for the surrounding region around each of the reference color coordinate points.

12. The non-transitory computer readable medium according to claim 8, wherein adjusting the weight includes adjusting the weight by setting the weight that is statistically associated with the evaluation value so that the color conversion accuracy of the color conversion characteristic model satisfies a value set in advance.

* * * * *